US008315272B2

(12) United States Patent
Baumer

(10) Patent No.: US 8,315,272 B2
(45) Date of Patent: Nov. 20, 2012

(54) SYSTEMS AND METHODS FOR DIGITAL INTERFACE TRANSLATION

(75) Inventor: Howard Baumer, Laguna Hills, CA (US)

(73) Assignee: Mobius Semiconductor, Inc., Irvine, CA (US)

( * ) Notice: Subject to any disclaimer, the term of this patent is extended or adjusted under 35 U.S.C. 154(b) by 404 days.

(21) Appl. No.: 12/552,240

(22) Filed: Sep. 1, 2009

(65) Prior Publication Data
US 2010/0111100 A1 May 6, 2010

Related U.S. Application Data

(60) Provisional application No. 61/093,690, filed on Sep. 2, 2008.

(51) Int. Cl.
H04L 12/28 (2006.01)

(52) U.S. Cl. ........ 370/465; 370/474; 370/252; 370/432; 370/335; 375/340; 375/321; 375/242; 714/786

(58) Field of Classification Search .................. 370/465, 370/474, 252, 432, 335; 375/240.01, 340, 375/321, 242; 714/786; 348/14.01
See application file for complete search history.

(56) References Cited

U.S. PATENT DOCUMENTS

| 7,065,052 | B1 * | 6/2006 | McBride | 370/252 |
| 7,913,152 | B2 * | 3/2011 | Jeong et al. | 714/786 |
| 2006/0256875 | A1 * | 11/2006 | McClellan | 375/242 |
| 2008/0180518 | A1 * | 7/2008 | Miyazaki | 348/14.01 |
| 2008/0240230 | A1 * | 10/2008 | Oxman et al. | 375/240.01 |
| 2009/0196260 | A1 * | 8/2009 | Stewart et al. | 370/335 |

* cited by examiner

Primary Examiner — Michael Thier
Assistant Examiner — Jamal Javaid
(74) Attorney, Agent, or Firm — Kauth, Pomeroy, Peck & Bailey LLP

(57) ABSTRACT

Systems and methods of digital interface translation are described. One embodiment of the invention includes multiple receiver lanes, where at least one of the receiver lanes is configured to receive a data channel at a first data rate and encoded in accordance with an input digital interface standard, an auxiliary channel input configured to receive an auxiliary data channel, and a single transmitter lane configured to output a single data channel at a second data rate and encoded in accordance with an output digital interface standard. In addition, the multilane to single lane digital interface translator is configured to decode the received data into data streams, and interleave the data streams to form packets, the multilane to single lane digital interface translator is configured to insert auxiliary data received via the auxiliary channel input and idle data between the packets to produce an output data stream that is rate matched to the second data rate, and the multilane to single lane digital interface translator is configured to encode the output data stream in accordance with the output digital interface standard.

10 Claims, 30 Drawing Sheets

Fig. 11a

Display Port Decoded Receive Data

Fig. 11b

XGMII Data

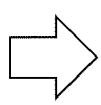

SYSTEMS AND METHODS FOR DIGITAL INTERFACE TRANSLATION

CROSS-REFERENCE TO RELATED APPLICATIONS

This application claims priority to U.S. Provisional Application No. 61/093,690, filed Sep. 2, 2008, the disclosure of which is incorporated herein by reference in its entirety.

BACKGROUND

The present invention relates generally to digital interface translators and more specifically to multilane to single lane and single lane to multilane digital interface translators.

Digital devices, such as personal computers and digital set top boxes, can be used to drive display devices such as monitors, projectors, and televisions. A variety of digital interfaces exist for communicating audio and video information in a digital format to a digital display device for rendering. These interfaces include Digital Visual Interface (DVI) specified by the Digital. Display Working Group of Vancouver, Wash., the High Definition Multimedia Interface (HDMI) promoted by HDMI Licensing, LLC of Sunnyvale Calif., and the Display Port standard issued by the Video Electronics Standards Association of Milpitas, Calif. Each of these standards supports the use of multiple channels for the transmission of video information and additional channels for the transmission of auxiliary information.

Cables are typically used to connect digital devices with digital displays. The length of the cable is typically limited by signal attenuation. In many instances, the extent of signal attenuation in a cable can be impacted by the construction quality and materials that were used. Signal attenuation and intersymbol interference in long cables can be compensated for by using adaptive equalization. A number of manufacturers offer amplifiers, equalizers, and repeaters that can be used to combat attenuation. HDMI extenders that are based on dual Category 5/Category 6 cable have been used to extend HDMI to 50 meters and HDMI extenders based on optical fiber can extend HDMI several hundreds of meters.

SUMMARY OF THE INVENTION

Digital interface translators and methods of digital interface translation are described in accordance with embodiments of the invention. One embodiment of the invention includes multiple receiver lanes, where at least one of the receiver lanes is configured to receive a data channel at a first data rate and encoded in accordance with an input digital interface standard, an auxiliary channel input configured to receive an auxiliary data channel, and a single transmitter lane configured to output a single data channel at a second data rate and encoded in accordance with an output digital interface standard. In addition, the multilane to single lane digital interface translator is configured to decode the received data into data streams, and interleave the data streams to form packets, the multilane to single lane digital interface translator is configured to insert auxiliary data received via the auxiliary channel input and idle data between the packets to produce an output data stream that is rate matched to the second data rate, and the multilane to single lane digital interface translator is configured to encode the output data stream in accordance with the output digital interface standard.

In a further embodiment, the multiple receiver lanes are configurable to decode data channels encoded in accordance with one of a plurality of digital interface standards.

In another embodiment, a plurality of receiver lanes are configured to receive input data channels, data received via the plurality of data channels is encoded in accordance with the input digital interface standard, the multilane to single lane digital interface translator is configured to decode the received data to produce code groups, where the same type of code group is on each lane at any given time, and the type of the code group is determined by the coding scheme used to encode the received data, the multilane to single lane digital interface translator is configured to interleave the code groups by mapping the code groups to packets, where each packet includes a specific type of code group, and the multilane to single lane digital interface translator is configured to insert auxiliary data and idle data between the packets to form the output data stream, which is rate matched to the second data rate.

In a still further embodiment, the output digital interface standard is the 10 Gigabit IEEE 802.3 Clause 49 standard.

In still another embodiment, the input digital interface standard is the Display Port standard.

In a yet further embodiment, the digital interface translator is configured to utilize the following definitions:
$\|C\|=/K_0x.y/K_1x.y/K_2x.y/K_3x.y/$
$\|D\|=/D_0x.y/D_1x.y/D_2x.y/D_3x.y/$
$\|S_{dp}\|=/S/D0.0/D0.0/D0.0/$
$\|T_0\|=/T/I/I/I/$, defined in IEEE 802.3 Clause 48
$\|I\|=/I/I/I/I/$, defined in IEEE 802.3 Clause 48 to map decoded data code groups Dx.y and decoded special code groups Kx.y to XGMII according to the following rules:
insert $\|S_{dp}\|$ in between $\|C\|$ and $\|D\|$;
insert $\|T_0\|$, $\|I\|$ in between $\|D\|$ and $\|C\|$;
pass $\|C\|$ through without modification;
insert $\|T_0\|$, $\|I\|$, ..., $\|I\|$, $\|S_{dp}\|$ in a sequence of $\|D\|$ to rate match to the output digital interface standard; and
insert $\|I\|$ in a sequence of $\|C\|$ to rate match to the output digital interface standard.

In yet another embodiment, the digital interface translator is configured to replace $\|I\|$ columns with auxiliary data received via the auxiliary channel.

In a further embodiment again, the input digital interface standard is the HDMI standard.

In another embodiment again, the digital interface translator is configured to utilize the following definitions:
$\|C_0\|=/K_2x.y/I/I/I/$
$\|C_1\|=/K_1x.y/K_2x.y/I/I/$
$\|C_2\|=/K_0x.y/K_1x.y/K_2x.y/I/$
$\|C_3\|=/K_0x.y/K_1x.y/K_2x.y/K_0x.y/,/K_1x.y/K_2x.y/K_0x.y/K_1x.y/, /K_2x.y/K_0x.y/K_1x.y/K_2x.y/$
$\|D\|=/D_0x.y/D_1x.y/D_2x.y/D_0x.y/,/D_1x.y/D_2x.y/D_0x.y/D_1x.y/, /D_2x.y/D_0x.y/D_1x.y/D_2x.y/$
$|S_{hv}\|=/S/D0.0/D0.0/D0.1/$, SOP for VDC data
$\|S_{hd}\|=/S/D0.0/D0.0/D1.1/$, SOP for Data Island TERC4 data
$\|T_0\|=/T/I/I/I/$, defined in IEEE 802.3 Clause 48
$\|I\|=/I/I/I/I/$, defined in IEEE 802.3 Clause 48 to map decoded data code groups Dx.y and decoded special code groups Kx.y to XGMII according to the following rules:
insert $\|S_{hv}\|$ in between $\|C_n\|$ and $\|D\|$ where $\|D\|$ is VDC data;
insert $\|S_{hd}\|$ in between $\|C_n\|$ and $\|D\|$ where $\|D\|$ is TERC4 data;
following any $\|S\|$, the $1^{st}$ $\|D\|=/D0/D1/D2/D0/$, the $2^{nd}$ $\|D\|=/D1/D2/D0/D1/$, and the $3^{rd}$ $\|D\|=/D2/D0/D1/D2/$, etc.;
insert $\|T_n\|$, $\|I\|$ in between $\|D\|$ and $\|C\|$, $\|T_1\|=/D2/T/I/I/$, $\|T_2\|=/D1/D2/T/I/$, $\|T_3\|=/D0/D1/D2/T/$;
after a $\|T_n\|$ or $\|I\|$, the 1st $\|C\|=/C0/C1/C2/C0/$, the 2nd $\|C\|=/C1/C2/C0/C1/$, and the 3rd $\|C\|=/C2/C0/C1/C2/$, etc.;

the last ‖C‖ before an ‖I‖, ‖S$_{hv}$‖ or ‖S$_{hd}$‖ is padded with /I/ code groups, ‖C‖=/C0/C1/C2/I/, /C1/C2/I/I/, or /C2/I/I/I/;

insert ‖T‖, ‖I‖, . . . , ‖I‖, ‖S$_{hv}$‖ or ‖S$_{hd}$‖ as appropriate in a sequence of ‖D‖ columns to rate match to 10.3125 GBaud;

insert ‖Tn‖, ‖I‖, . . . , ‖I‖, ‖S$_{hv}$‖ or ‖S$_{hd}$‖ as appropriate in a sequence of ‖D‖ columns to rate match to 10.3125 GBd; and insert ‖I‖ in a sequence of ‖C‖ to rate match to the output digital interface standard.

In a further additional embodiment, the digital interface translator is configured to replace ‖I‖ columns with auxiliary data received via the auxiliary channel.

In another additional embodiment, the input digital interface standard is the DVI standard.

A still yet further embodiment includes a single receiver lane configured to receive a single input data channel encoded in accordance with an input digital interface standard, where the input data channel includes packets, and auxiliary data and idle data inserted between the packets, multiple transmitter lanes, where at least one of the transmitter lanes is configured to transmit an output data channel encoded in accordance with an output digital interface standard, and an auxiliary channel output configured to transmit an auxiliary data channel. In addition, the single lane to multilane digital interface translator is configured to extract auxiliary data inserted between received packets and output the auxiliary data via the auxiliary channel, the single lane to multilane digital interface translator is configured to decode the data within the packets received on the single receiver lane to produce code groups, the single lane to multilane digital interface translator is configured to deinterleave the code groups and to decode the deinterleaved code groups to obtain at least one output stream, and the single lane to multilane digital interface translator is configured to encode the at least one output stream in accordance with the output digital interface standard.

In still yet another embodiment, the multiple transmitter lanes are configurable to encode the decoded code groups for output on at least one data channel in accordance with one of a plurality of digital interface standards.

In a still further embodiment again, each packet contains encoded code groups, where the code groups are encoded in accordance with the input digital interface specification and all of the code groups in each packet are of the same type, the single lane to multilane digital interface translator is configured to decode the data in each packet and to deinterleave the code groups so that code groups of the same type are on each of the transmitter lanes at any given time; and the single lane to multilane digital interface translator is configured to encode the decoded code groups according to the type of the code group.

In still another embodiment again, the input digital interface standard is the 10 Gigabit IEEE 802.3 Clause 49standard.

In still a further additional embodiment, the output digital interface standard is the Display Port standard.

In still another additional embodiment, the digital interface translator is configured to utilize the following definitions:

‖C‖=/K$_0$x.y/K$_1$x.y/K$_2$x.y/K$_3$x.y/
‖D‖=/D$_0$x.y/D$_1$x.y/D$_2$x.y/D$_3$x.y/
‖S$_{dp}$‖=/S/D0.0/D0.0/D0.0/
‖T$_0$‖=/T/I/I/I/, defined in IEEE 802.3 Clause 48
‖I‖=/I/I/I/I/, defined in IEEE 802.3 Clause 48 to discard ‖S$_{dp}$‖, ‖T$_0$‖, and ‖I‖ columns in the input data channel and to deinterleave ‖C‖ and ‖D‖ columns in the input data channel.

In a yet further embodiment again, the input digital interface standard is the HDMI standard.

In yet another embodiment again, the digital interface translator is configured to utilize the following definitions:

‖C$_0$‖=/K$_2$x.y/I/I/I/
‖C$_1$‖=/K$_1$x.y/K$_2$x.y/I/I/
‖C$_2$‖=/K$_0$x.y/K$_1$x.y/K$_2$x.y/I/
‖C$_3$‖=/K$_0$x.y/K$_1$x.y/K$_2$x.y/K$_0$x.y/,/K$_1$x.y/K$_2$x.y/K$_0$x.y/K$_1$x.y/, /K$_2$x.y/K$_0$x.y/K$_1$x.y/K$_2$x.y/
‖D‖=/D$_0$x.y/D$_1$x.y/D$_2$x.y/D$_0$x.y/,/D$_1$x.y/D$_2$x.y/D$_0$x.y/D$_1$x.y/, /D$_2$x.y/D$_0$x.y/D$_1$x.y/D$_2$x.y/
|S$_{hv}$‖=/S/D0.0/D0.0/D0.1/, SOP for VDC data
‖S$_{hd}$‖=/S/D0.0/D0.0/D1.1/, SOP for Data Island TERC4 data
‖T$_0$‖=/T/I/I/I/, defined in IEEE 802.3 Clause 48
‖I‖=/I/I/I/I/, defined in IEEE 802.3 Clause 48 to discard ‖S$_{hv}$‖, ‖S$_{hd}$‖, ‖T$_0$‖, and ‖I‖ columns in the input data channel and to deinterleave ‖C‖ and ‖D‖ columns in the input data channel.

In a yet further additional embodiment, the input digital interface standard is the DVI standard.

Yet another additional embodiment includes receiving the multiple channels of data via multiple input lanes, receiving the at least one channel of auxiliary data via an auxiliary input, decoding the multiple channels of data to produce code groups, where the code groups are defined so that the same type of code group is present on each of the receiver lanes at any given time, interleaving the data code groups by mapping the code groups to packets, where each packet includes a specific type of code group to produce an output data stream, inserting idle data and auxiliary data into the output data stream to match the rate of the output data stream to the rate of an output lane, encoding the rate matched output data stream in accordance with the output digital interface, and outputting the encoded rate matched data stream via an output lane.

A further additional embodiment again also includes inserting idle data into the single data stream to match the rate of the single data stream to the rate of the output lane, and replacing idle data with auxiliary data.

Another additional embodiment again includes receiving the single input channel via a single input lane, extracting the auxiliary data from the received single input channel, decoding the data in each packet to obtain code groups, deinterleaving the code groups and decoding the code groups to produce multiple output data streams, encoding the multiple output data streams, where the encoding of each code group is determined by the type of the code group, and outputting the encoded output data streams via multiple transmitter lanes in accordance with the output digital interface specification.

BRIEF DESCRIPTION OF THE DRAWINGS

Figures 11A, 11B:
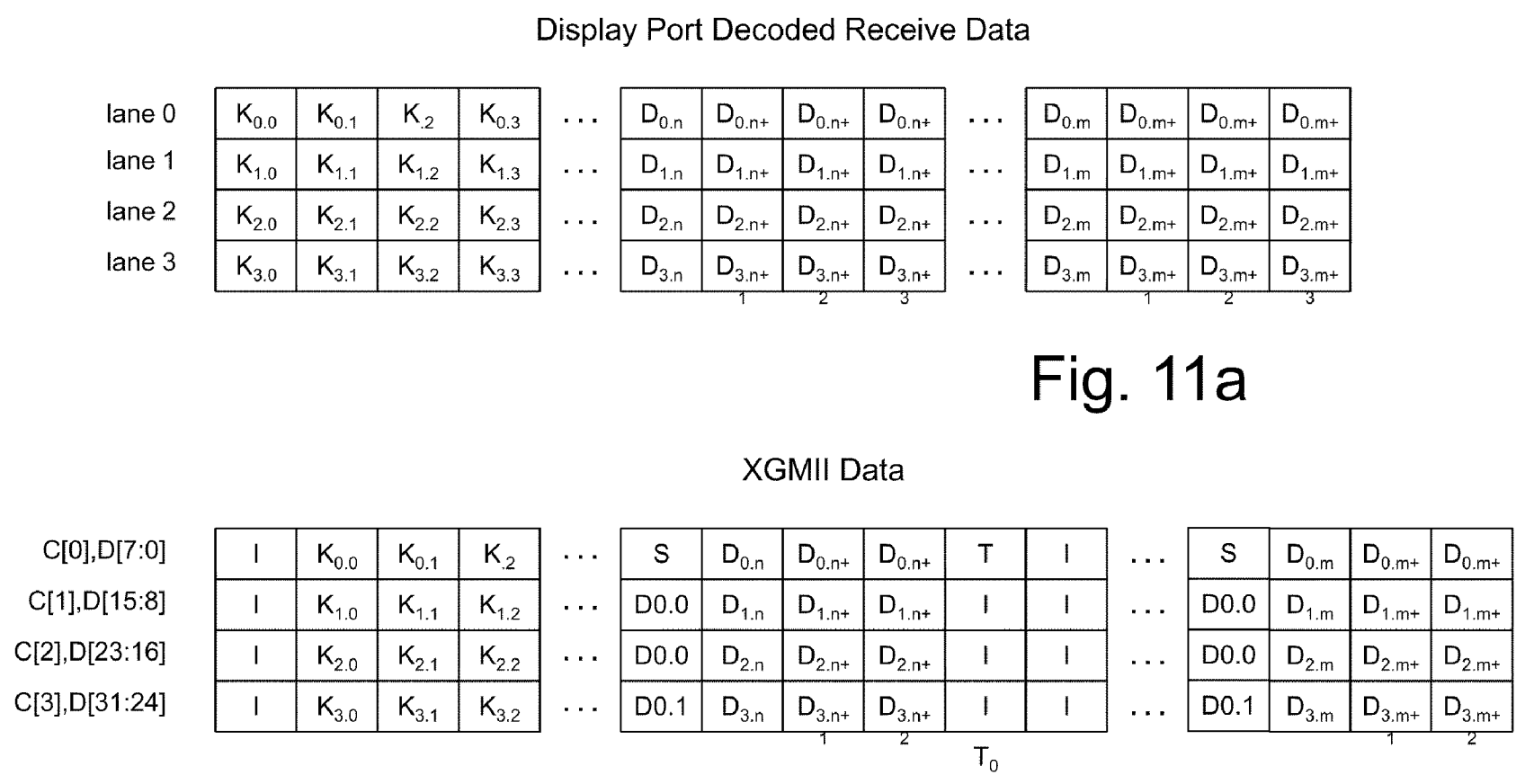

FIGS. 11a and 11b conceptually illustrate the mapping of decoded data, originally encoded according to the Display Port standard, to XGMII in accordance with an embodiment of the invention.

FIGS. 13a, 13b, and 13c conceptually illustrate the mapping of decoded data, originally encoded according to the HDMI standard, to XGMII in accordance with an embodiment of the invention.

DETAILED DESCRIPTION OF THE INVENTION

Turning now to the drawings, digital interface translators are disclosed. In many embodiments, the digital interface translators can interleave data received via multiple lanes into a single data stream output on a single lane. In several embodiments, the digital interface translators can operate in multiple modes where each mode enables the interleaving of digital data provided in accordance with a different digital interface standard. In a number of embodiments, the data received on the multiple input channels is decoded to code groups in such a way that the same type of code group is on each lane at any given time. The code groups are then mapped to XGMII so that the data code groups are transmitted over optical fiber as Ethernet packets. Idle columns can also be inserted into the data stream to achieve rate matching with the single lane output. Following mapping, information from auxiliary channels can be inserted in place of the idle columns. Inserting information from auxiliary channels into idle columns results in a single data stream, output via the single lane output of the digital interface translator that includes interleaved data received via the multiple lanes and auxiliary data. When a data stream generated by a digital interface translator in accordance with an embodiment of the invention is received on a single lane of a second digital interface translator, the second digital interface translator can apply the reverse processes to generate a multiple channel output data stream, which is output via a multiple lane output of the digital interface translator. The digital interface translator can also extract auxiliary data from the received data stream and output the auxiliary data via one or more auxiliary channel(s).

Digital interface translators in accordance with embodiments of the invention are discussed below. The term "block" is frequently used to refer to a group of circuits that perform a specific function or set of functions within the digital interface translator. A digital interface translator is typically fabricated as an integrated circuit and the actual circuits used to implement the "blocks" described below are determined based upon the type of process used in the fabrication of the integrated circuit. Although specific reference is made to "blocks" in the context of an integrated circuit, digital interface translators can be implemented using a variety of techniques, including the application of microprocessors in combination with other devices, in accordance with embodiments of the invention.

Basic Architecture

Figure 1:
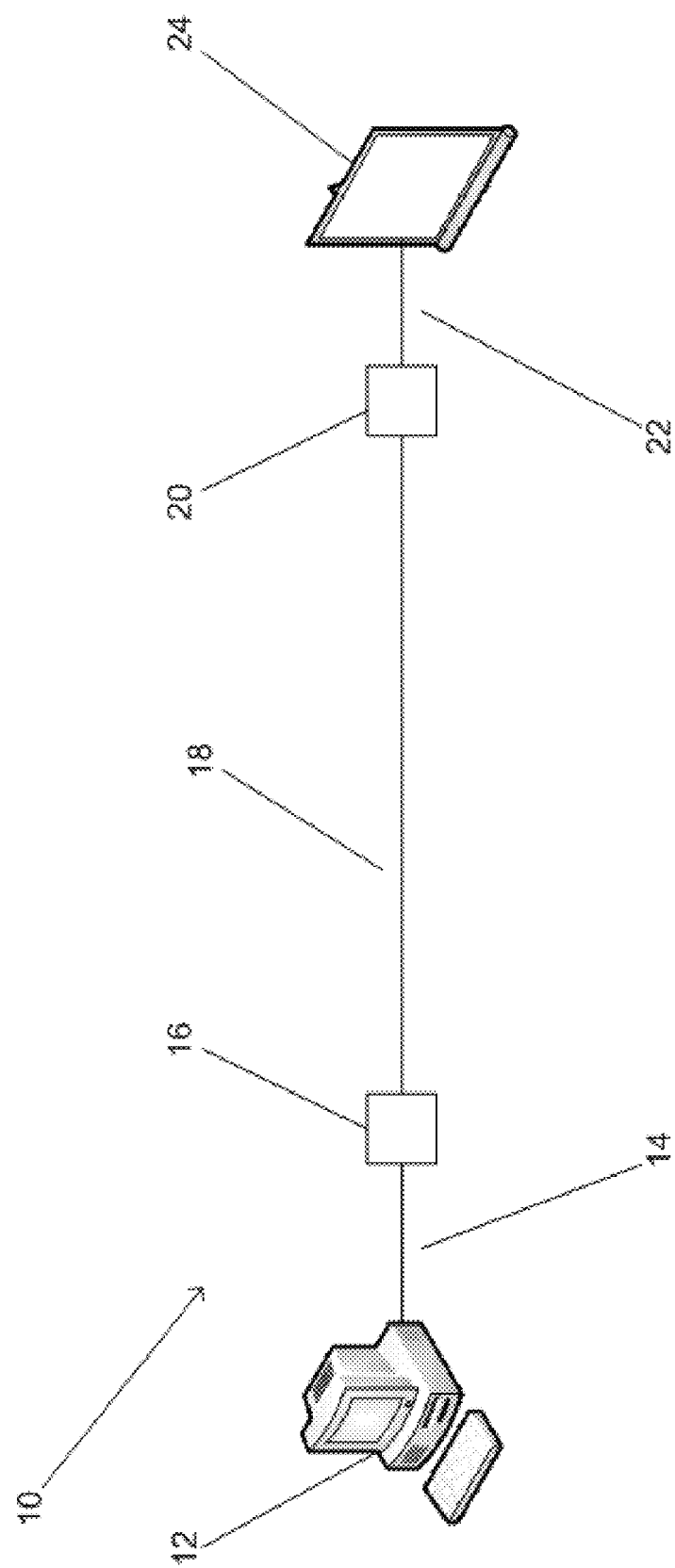
FIG. 1 is a network diagram showing the use of a pair of digital interface translators positioned between cables and an optical fiber to connect a digital device to a digital display.

A system including a pair of digital interface translators positioned between cables and an optical fiber to connect a digital device to a digital display in accordance with an embodiment of the invention is shown in FIG. 1. The system 10 includes a digital device 12 that is configured to output audio, video and auxiliary data via multiple channels using a cable 14 constructed in accordance with a digital interface standard. In several embodiments, the cable is constructed in accordance with the Display Port standard. In many embodiments, the cable is constructed in accordance with the HDMI standard. In many embodiments, the cable is constructed in accordance with the DVI standard. In still other embodiments, the cable can be constructed in accordance with any digital interface standard including but not limited to the XAUI standard specified in Clause 48 of the IEEE 802.3ae 10 Gigabit Etherenet specification.

In the illustrated embodiment, the cable connects to a digital interface translator 16 that is also connected to an optical fiber 18. The digital interface translator interleaves the multiple channels of information received via the cable and outputs a single channel of information that is transmitted via the optical fiber. In several embodiments, the digital interface translator is configurable and can translate from one of a number of input digital interfaces to a fixed output optical interface or one of a selection of output optical interfaces. In other embodiments, the digital interface translator outputs information formatted in accordance with a single channel interface standard appropriate to the application.

The optical fiber 18 is connected to a second digital interface translator 20, which is also connected to a second cable 22. The second digital interface translator translates the data channel received via the optical fiber to the original digital interface format, which is transmitted to a digital display device 24 via the cable 22. The characteristics of source/transmit digital interface translators and sink/receive digital interface translators are discussed further below.

Digital Interface Translators

Figure 2:
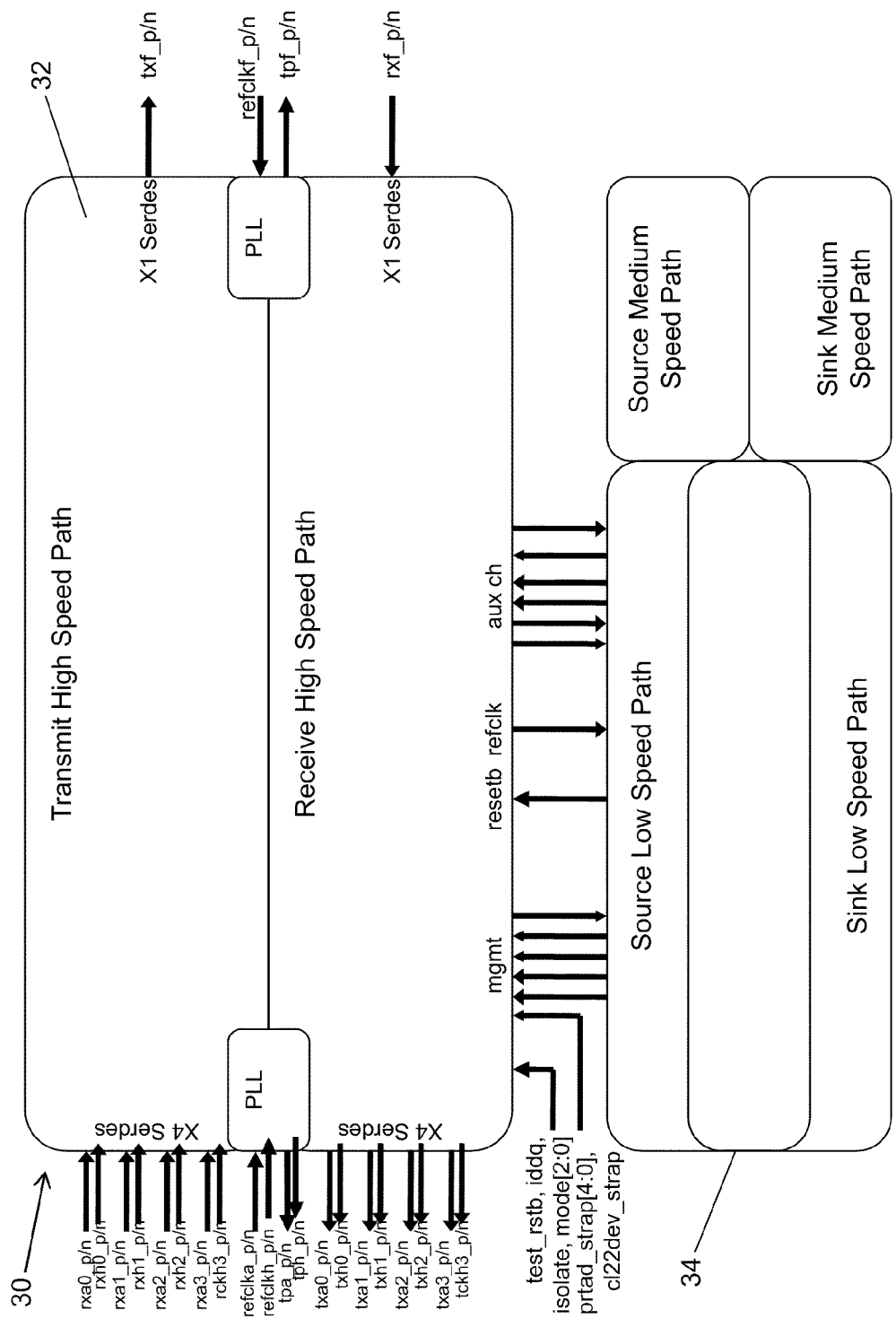
FIG. 2 is a block diagram of a digital interface translator in accordance with an embodiment of the invention.

A digital interface translator in accordance with an embodiment of the invention is shown in FIG. 2. The digital interface translator includes a transceiver data block 32 and a auxiliary data block 34. The transceiver data block 32 includes two paths, the transmit high speed path and the receive high speed data path, which enables the digital interface translator to act as a source/transmit digital interface translator and/or a sink/receive digital interface translator. The transmit high speed data path includes multiple lanes that receive as their inputs multiple data channels and a single output lane that outputs a single data channel. In a number of embodiments, data from one or more auxiliary channel(s) is also inserted into the single data channel by the digital interface translator. In many embodiments, the input channels are formatted in accordance with a digital interface standard such as but not limited to Display Port, HDMI, DVI or XAUI. In a number of embodiments, the digital interface translator can be configured to accept multiple data channels formatted in accordance with a digital interface selected from a number of supported digital interfaces. In several embodiments, the output channel is formatted in accordance with a single channel 10 Gigabit Ethernet standard. Although many embodiments disclosed herein output a single channel formatted in accordance with the 10 Gigabit Ethernet standard, any single lane output format that has idle fields can be used in accordance with embodiments of the invention. In many embodiments, the digital interface translator can be configured to output a single data channel formatted in accordance with a format selected from a number of supported interface formats.

The receive high speed data path receives a single high speed data channel via a single lane input and outputs multiple channels on multiple lanes. In many embodiments, the digital interface translator also outputs a separate auxiliary channel. As discussed above, many digital interface translators in accordance with embodiments of the invention support multiple digital interfaces and the digital interface translator can be configured to output data formatted in accordance with a digital interface standard selected from a number of possible digital interface standards.

Many digital interface standards accommodate transmission of auxiliary data. For example the HDMI standard provides for an independent auxiliary data channel such as a DDC channel, a CEC channel, and/or a USB 2.0 channel, and the Display Port standard provides for an independent auxiliary data channel such as an AUX channel, and/or a USB 2.0 channel. In the illustrated embodiment, auxiliary data is provided to the transceiver data block 32 by the auxiliary data block 34 and the transceiver data block 32 inserts the auxiliary data into the interleaved data stream in a manner that enables recovery of the auxiliary data. The amount of bandwidth available for insertion of auxiliary data depends upon the digital interface standard being used in a specific application. The insertion and recovery of auxiliary data is discussed further below.

The auxiliary data block can be constructed in a conventional manner in accordance with the requirements of a specific application. In many embodiments, the auxiliary data block also handles management functions that enable configuration of the transceiver data block and communication between the transceiver data block and external devices.

Transceiver Data Blocks

Figure 3:
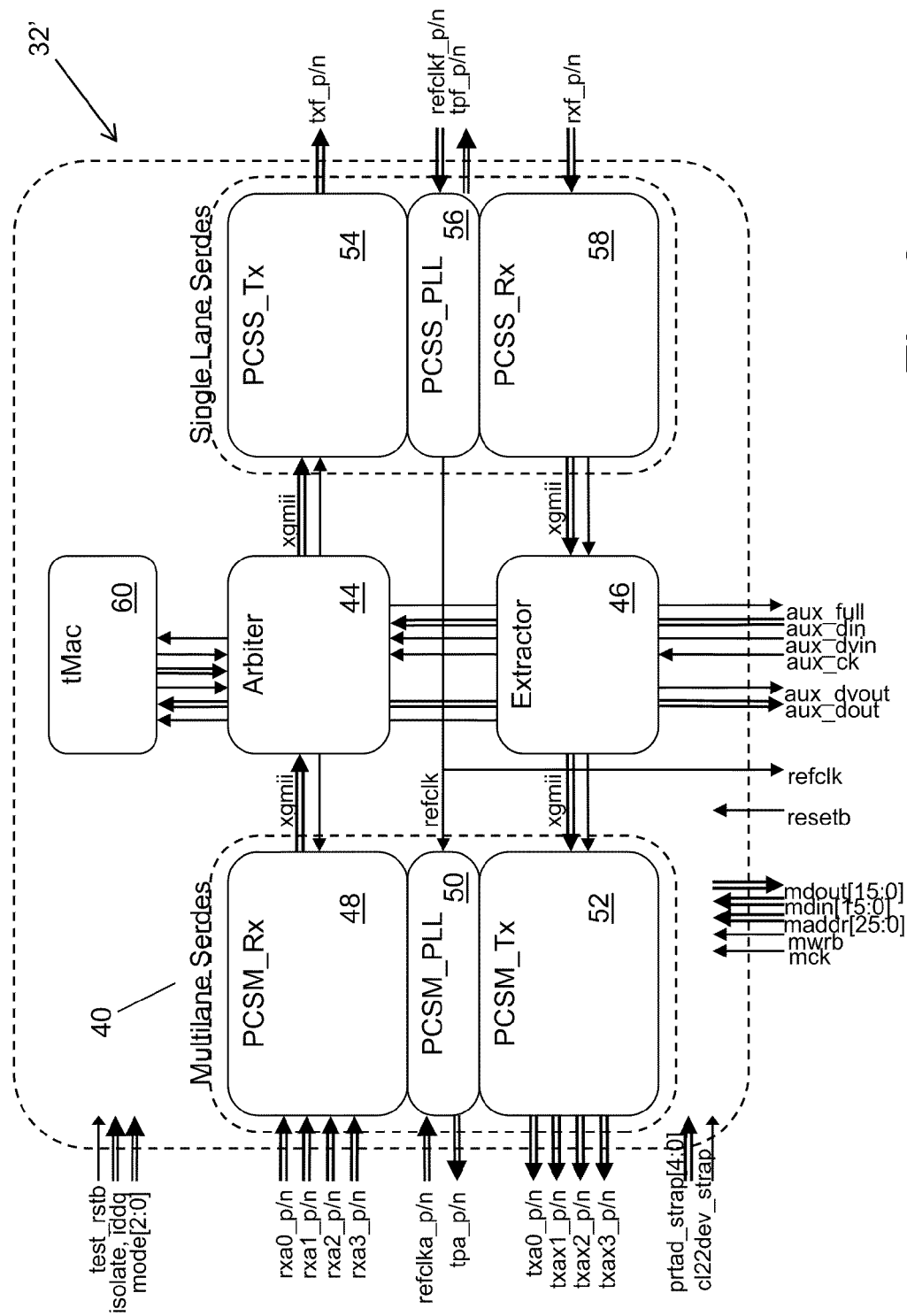
FIG. 3 is a block diagram of the transceiver data block of a digital interface translator in accordance with an embodiment of the invention.

A transceiver data block in accordance with an embodiment of the invention is illustrated in FIG. 3. The transceiver data block 32' includes a multilane serializer/deserializer (serdes) 40 and a single lane serdes 42. An arbiter 44 and an extractor 46 interface the multilane serdes 40 and the single lane serdes 42. The multilane serdes 40 includes a multilane Rx block, a multilane phase lock loop (PLL) 50 and a multilane Tx block 52. The single lane serdes includes a single lane Tx block 54, a single lane PLL 56, and a single lane Rx block 58. The operation of the multilane serdes, arbiter and single lane serdes in the transmit high speed path of a transceiver data block can be understood with reference to the flow chart illustrated in FIG. 4a. The operation of the single lane serdes, the extractor, and the multilane serdes in the receive high speed path of a transceiver data block can be understood with reference to the flow chart illustrated in FIG. 4b.

Transmit High Speed Path

Figures 4A, 4B:
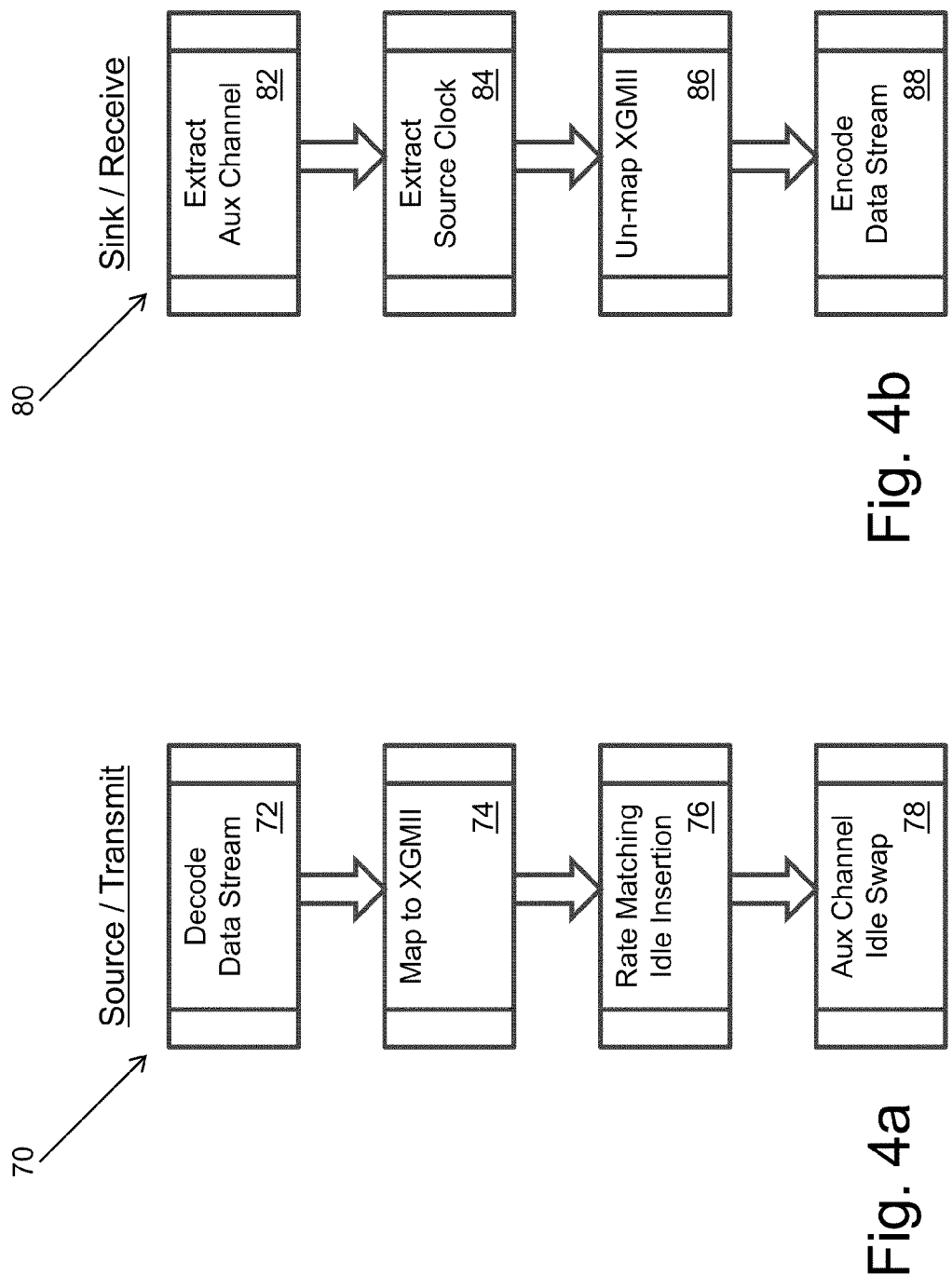
FIGS. 4a and 4b are flow charts showing processes for interleaving multiple lanes to a single lane and for deinterleaving a single lane to multiple lanes in accordance with embodiments of the invention.

A process for translating multiple channels of data encoded according to a predetermined digital interface standard received via multiple lanes and auxiliary data to a single data stream including auxiliary data output on a single lane in accordance with an embodiment of the invention is shown in FIG. 4a. The process 70 includes decoding (72) the data received on each lane. As will be discussed further below, different digital interface standards specify different codes. In addition, a single standard may require the application of different codes to different parts of the data stream. Therefore, the decoding process is matched to the data interface standard and data being received. As is discussed further below, the decoding process decodes the received data to produce code groups so that the same type of code group is on each of the lanes at any given time. The code groups on each of the lanes are mapped (74) to a predetermined code. In many embodiments, the data code groups are formatted as Ethernet packets and idle columns are inserted into the output stream to rate match (76) to the rate of the digital interface translator's single lane output. Data from auxiliary channel(s) can be swapped (78) for idle columns to insert auxiliary data into a single output stream that includes interleaved data from the multiple input lanes. Although a specific process is shown in FIG. 4a, other processes involving decoding, mapping, rate matching and the insertion of auxiliary data can be used in accordance with embodiments of the invention that are appropriate to a specific application.

Receive High Speed Path

A process that is substantially the reverse of the process illustrated in FIG. 4a can be used to translate the data output by a digital interface translator back to the data's original format. A process in accordance with an embodiment of the invention for translating a single channel of data encoded in accordance with a predetermined digital interface standard and including auxiliary data, which is received via a single lane, to multiple channels of data encoded in accordance with a second predetermined digital interface standard output via multiple lanes and a separate data channel is shown in FIG. 4b.

The flow charts illustrated in FIGS. 4a and 4b provide an overview of functions that can be performed by various circuit blocks within a transmit high speed path and a receive high speed data path of a transceiver data block in accordance with an embodiment of the invention. Various circuit blocks that can be used in the construction of a transmit high speed path and a receive high speed data path of a transceiver data block in accordance with an embodiment of the invention are discussed below.

Multilane RX Blocks

Figure 5:
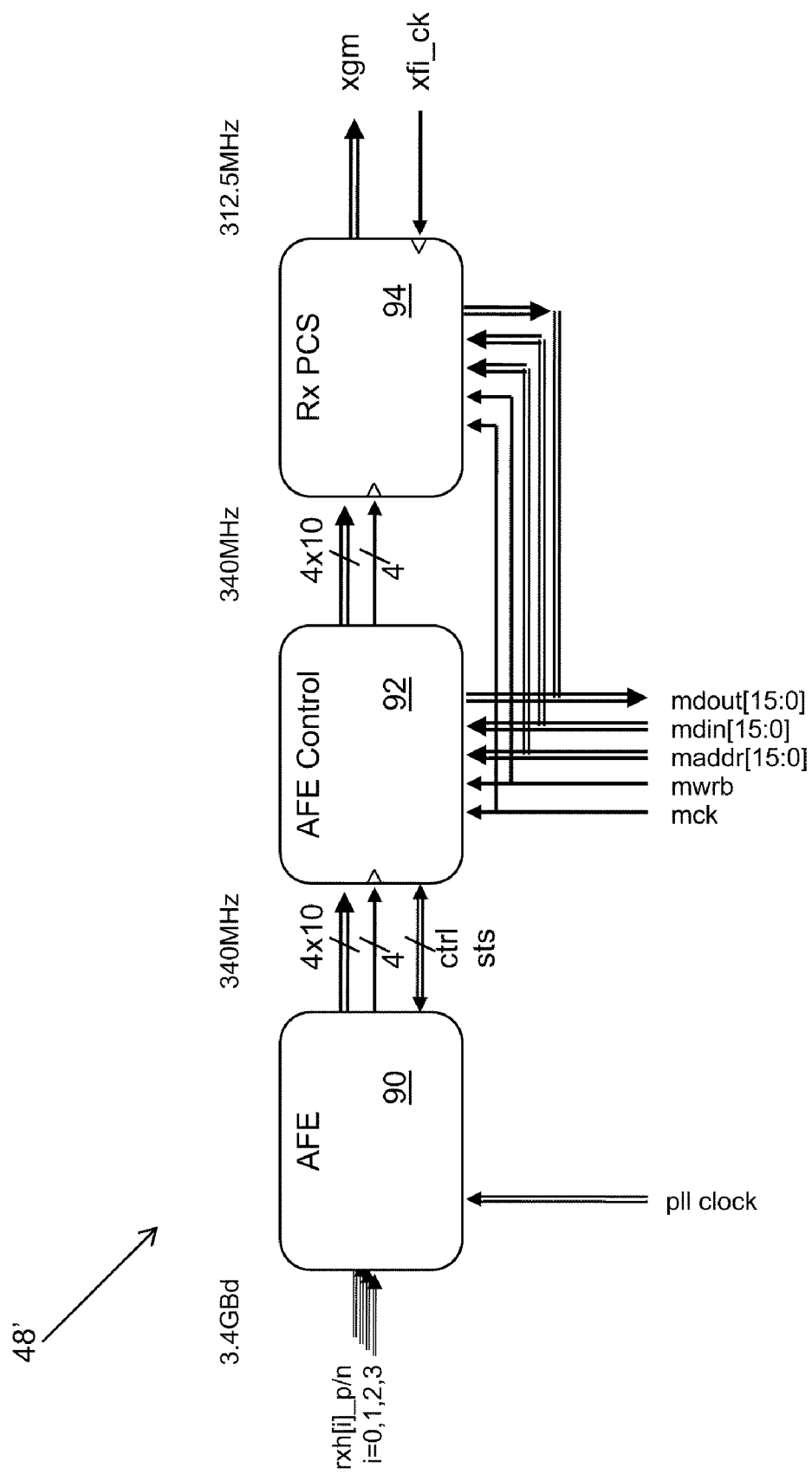
FIG. 5 is a block diagram of a multilane Rx block in accordance with an embodiment of the invention.

A multilane Rx block that can be used in the construction of a multilane serdes of a digital interface translator in accordance with an embodiment of the invention is shown in FIG. 5. The multilane Rx block 48' includes an Analog Front End (AFE) block 90 that receive inputs via multiple lanes. In the illustrated embodiment, the AFE block 90 includes four lanes, however, data can often be received on less than the full complement of lanes. In addition, many embodiments of the invention include more than four lanes. For example, a digital interface translator can be constructed that includes 8, 10, or 16 lanes. Accordingly, the invention need not be limited to a specific number of lanes. The AFE block 90 recovers data converting it to the logical bit stream for each lane. The AFE block 90 is connected to an AFE control block 92. The AFE control block 92 is connected to a multilane Rx physical coding sublayer (PCS) block 94 that outputs a data stream on a single lane. The AFE control block 92 and the multilane Rx PCS block 94 can communicate with external devices via management connections. The AFE block 90 and the AFE control block 92 can be implemented in accordance with any conventional design appropriate to an application and considering the digital interface standards supported by the digital interface translator. Implementations of multilane Rx PCS blocks in accordance with embodiments of the invention are discussed below.

Multilane RX PCS Blocks

Figure 6:
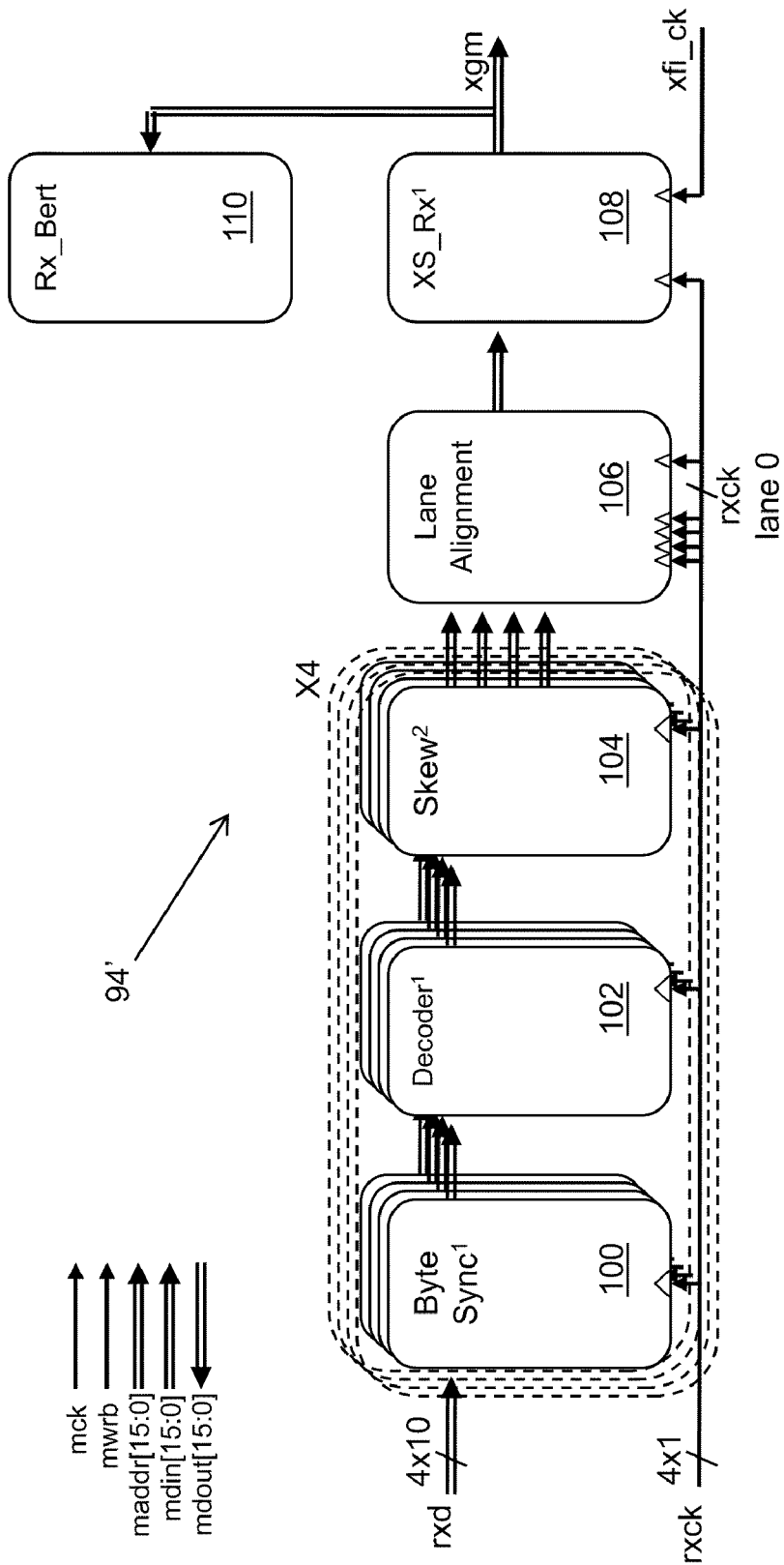
FIG. 6 is a block diagram of a multilane Rx PCS block in accordance with an embodiment of the invention.

A multilane Rx PCS block in accordance with an embodiment of the invention is shown in FIG. 6. The multilane Rx PCS block 94' receives four lanes of data and four clock signals. The four lanes and clock signals are provided to four byte sync blocks 100. The output of the byte sync blocks and the clock signals are provided to four decoder blocks 102. The outputs of the four decoder blocks and the clock signals are provided to a skew block 104. The outputs of the skew blocks and the clock signals are provided to a lane alignment block 106. The lane alignment block provides a single output to a multiple lane Rx mapper block 108 that provides a single channel output via a single lane and an output clock signal. A bit error rate testing (BERT) block 110 monitors the output of the multiple lane Rx mapper block 108.

Each byte sync block 100 aligns bytes received via the different lanes per the requirements of the specific digital interface standard and provides the bytes to a decoder block 102. The configuration of each decoder block 102 depends upon the digital interface standard with which the received data complies. In embodiments where multiple digital interface standards are supported, separate decode groups can be provided to decode data for each of the digital interface standards. Alternatively, a single decode group can be provided for each lane that is configurable to decode data formatted in accordance with one of a number of different digital interface standards. The decode groups are typically standards based. For example, Display Port and XAUI decoders are used in many embodiments of the invention. In a number of embodiments, custom decoders are used. For example, several embodiments use custom HDMI or DVI decoders. A feature of decoder blocks in accordance with many embodiments of the invention is that no matter the number of lanes upon which data is received (i.e. no matter whether the input is utilizing 1, 2, 3 or 4 of the input channels), the decoder blocks ensure that the received data is decoded to code groups so that the same type of code group is on each lane at any given time. Various implementations of byte sync blocks and decoder blocks are discussed below with reference to FIGS. 7-9.

The skew blocks 104 correct for any known lane to lane skew that was purposefully inserted, providing an output where the code groups on each lane are the same and are aligned with each other. Skew blocks can be implemented in accordance with an appropriate conventional design. The deskewed lanes are provided to a lane alignment block 106, which looks for alignment mark boundaries to further align the code groups. The alignment block 106 then interleaves the code groups from the aligned lanes and provides the single interleaved stream to the multiple lane Rx mapper block 108. As with the decoder, the implementation of the multiple lane Rx mapper block depends upon the digital interface standard with which the received data complies. In many embodiments, the multiple lane Rx mapper block maps the code groups so that data code groups are formatted as Ethernet packets and so that idle columns are inserted into the stream to match the output stream to the rate of the single lane output of the multilane Rx PCS block. In other embodiments, the multiple lane Rx mapper block maps the code groups so that code groups are formatted in accordance with another appropriate format. Implementations of alignment blocks and multiple lane Rx mapper blocks in accordance with embodiments of the invention are discussed below with reference to FIGS. 10-14b.

Byte Sync Blocks

Figure 7:
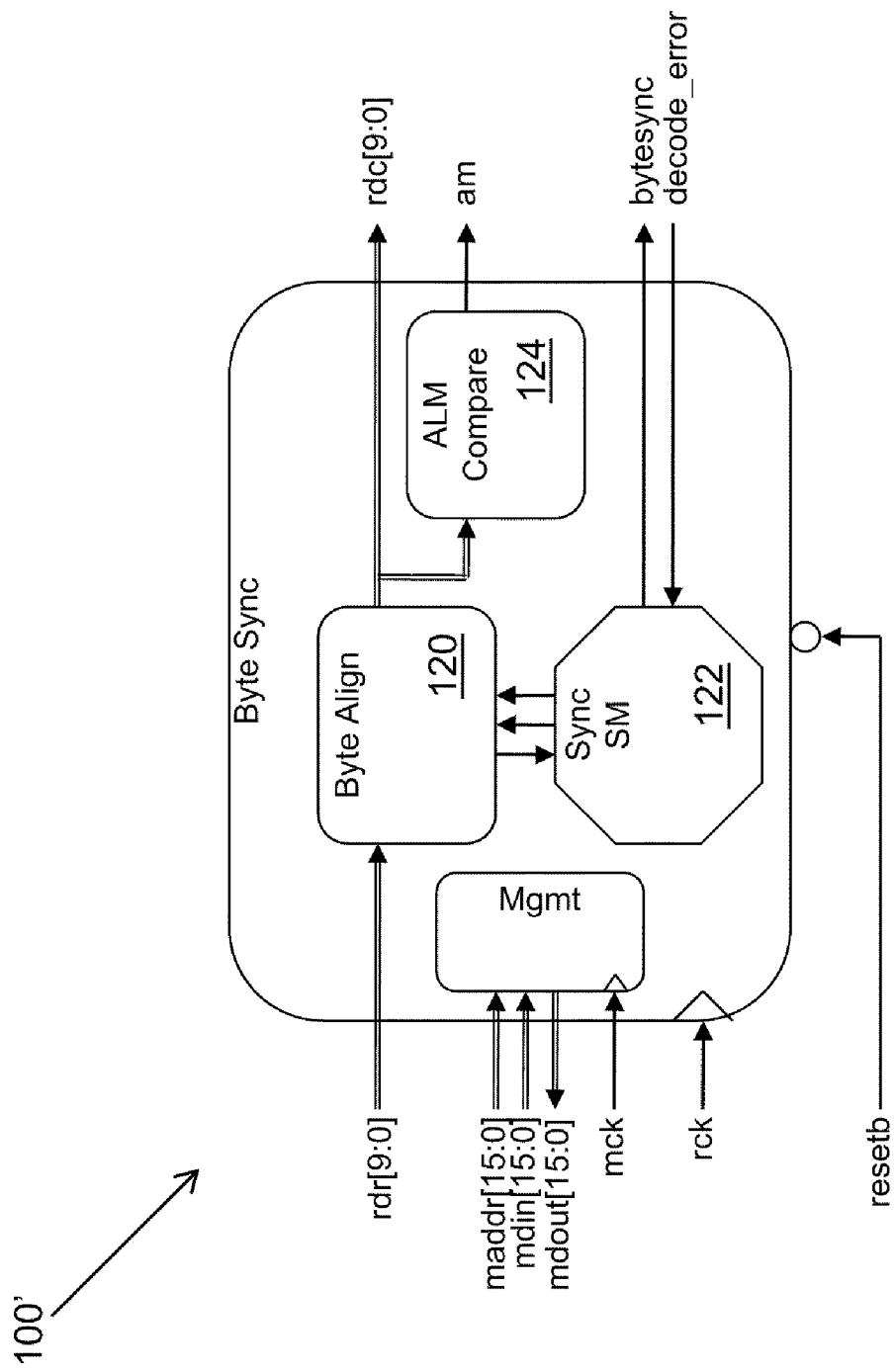
FIG. 7 is a block diagram of a byte sync block in accordance with an embodiment of the invention.
Figure 8:
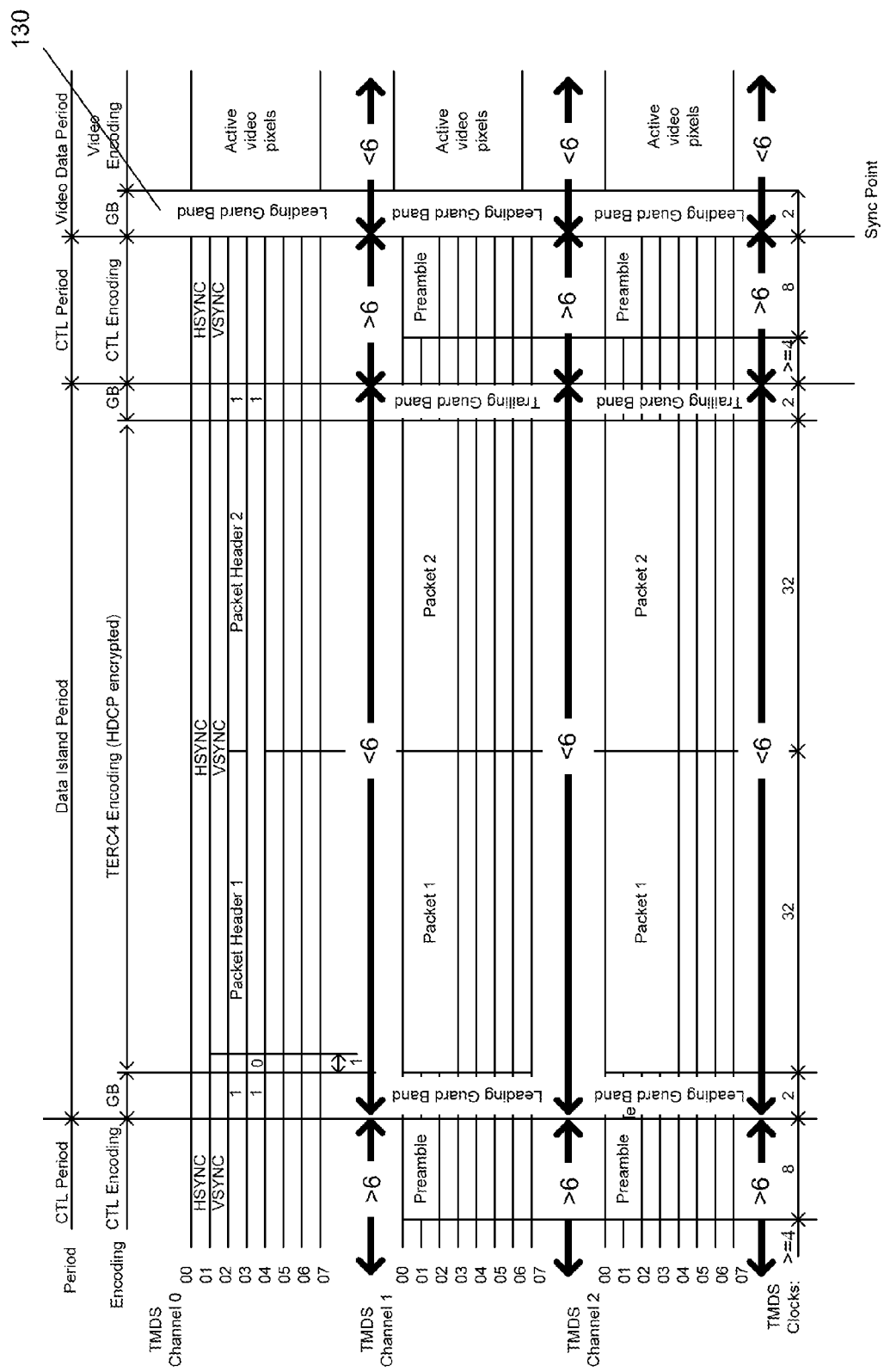
FIG. 8 is a timing diagram showing information transmitted on three HDMI channels, the encoding of the transmitted information, and a point that can be used for the alignment of the three channels in accordance with an embodiment of the invention.

A byte sync block in accordance with an embodiment of the invention is shown in FIG. 7. The byte sync block 100' includes a byte align block 120 that receives the single lane as an input and outputs a single lane of byte aligned data. A sync state machine 122 is connected to the byte align block 120 and coordinates the function of the byte align block. Both the byte align block and the sync state machine can be implemented in accordance with conventional designs appropriate to the application. An Address aLignment Module (ALM) compare block 24 receives the output of the byte align block 120 as an input. The ALM block 124 detects byte alignment patterns and outputs a signal indicative of the output of the byte align block 120 being on an alignment mark boundary. The operation of the ALM compare block 124 depends upon the digital input standard according to which the input lane has been formatted. For a number of digital interface standards such as Display Port and XAUI, an alignment mark boundary is defined as part of the standard. When the input data is formatted in accordance with the HDMI or DVI standard, the ALM compare block 124 can use the boundary between the control (CTL) period and the Video Data Period shown in FIG. 8 as the alignment mark boundary. In other embodiments, other boundaries can be used as alignment boundaries in accordance with embodiments of the invention that are appropriate to the application.

In embodiments where multiple digital interface standards are supported, separate ALM compare blocks 124 can be implemented for each digital interface standard and the appropriate ALM compare block selected depending upon the mode of the digital interface translator. In other embodiments, a single ALM compare block 124 is implemented that can be configured for each of a number of digital interface standards.

Decoder Blocks

Decoder blocks in accordance with embodiments of the invention decode received data into data streams that can then be mapped to a predetermined single lane format by the multilane Rx mapper block. In many embodiments, the predetermined single lane format is the 10 Gigabit Media Independent Interface (XGMII) standard, which includes data code groups (Dx.y) and special code groups (Kx.y).

The nature of the decoder depends upon the encoding of the received data. Many digital interface standards utilize 8B10B encoding. 8B10B is a line code that maps 8-bit symbols to 10-bit symbols to achieve DC balance and bounded disparity, while providing sufficient state changes to enable reasonable clock recovery. A decoder block for decoding 8B10B code from a Display Port interface or a XAUI interface can be implemented in accordance with IEEE 802.3 Clauses 36 and 48. The Display Port standard is defined so that the same type of data is on each of the lanes at the same time. When a 1 or 2 lane configuration is used in compliance with the Display Port standard, the data from lane 1 or lanes 1 and 2 is replicated.

A number of digital interface standards such as the HDMI standard do not employ 8B10B encoding. The HDMI standard is particularly complex in that it uses four different encoding schemes: video data coding (VDC), which is rate 10/8; guard band (GB), which is rate 10/1; TERC4 coding, which is rate 10/4; and control period coding (CPC), which is rate 10/2. The application of the encoding techniques during the different periods specified within the HDMI format can be understood with reference to FIG. 8. The various encoding techniques used in HDMI prevent the use of a single decoder. The DVI standard is similar to the HDMI standard, but without the Data Island Period. Therefore, similar processes to those outlined herein with respect to HDMI can be used to decode data formatted according to the DVI standard.

An HDMI Decoder

Figure 9:
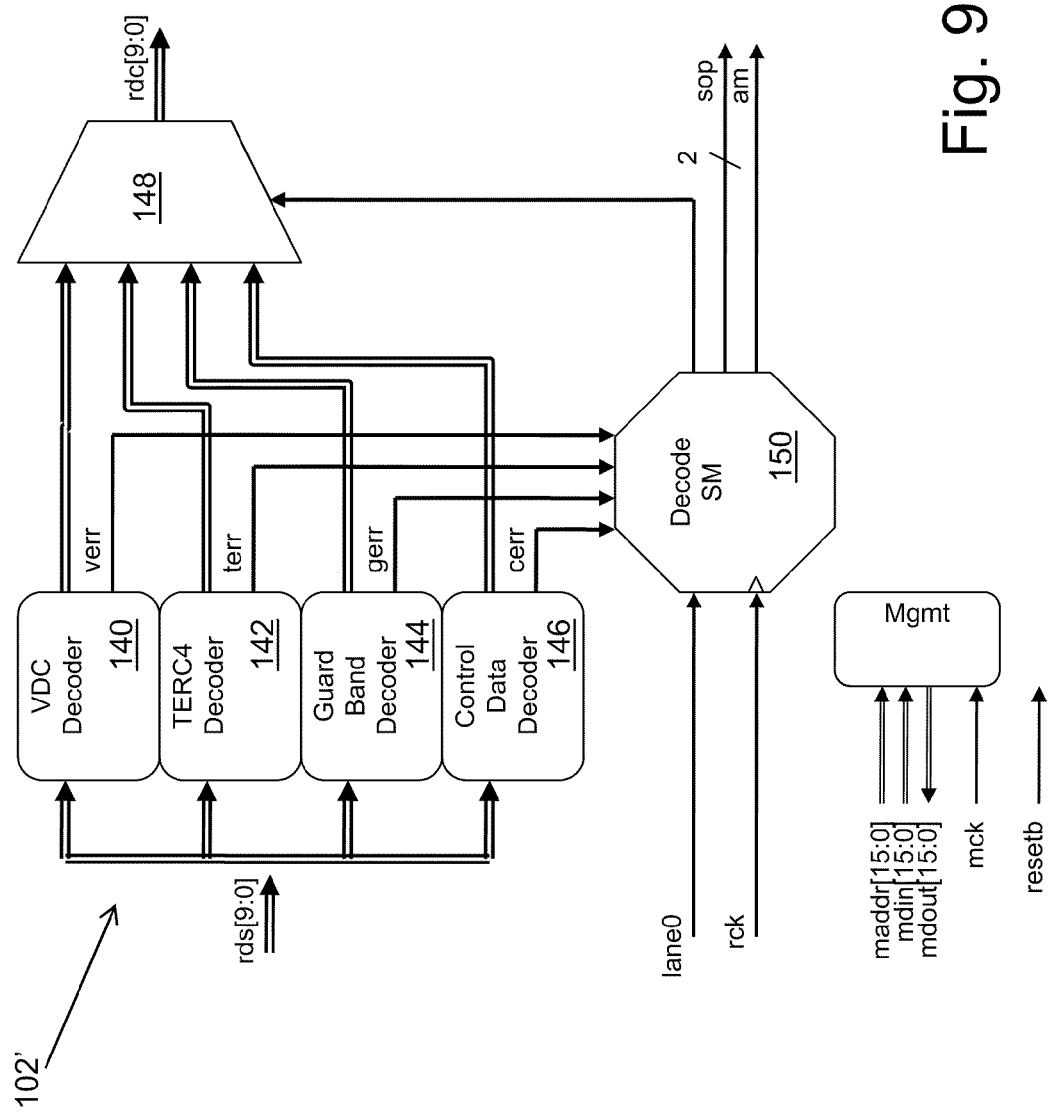
FIG. 9 is a block diagram of an HDMI decoder block in accordance with an embodiment of the invention.

An HDMI decoder block in accordance with an embodiment of the invention is shown in FIG. 9. The HDMI decoder block 102' receives data via a single lane connected to four decoders operating in parallel. The decoders are a VDC decoder 140, a TERC4 decoder 142, a GB decoder 144, and a CPC decoder 146. Each decoder provides a decoded data stream to a multiplexer 148. The input of the multiplexer 148 that is selected as its output is controlled by a decode state machine 150. The decode state machine takes as its inputs a signal that selects lane 0 CPC to TERC4 decoding, and signals from each of the encoders that indicate whether there is no valid encoder output for the received data. The decode state machine outputs two signals: a sop signal, and an am signal. The sop signal indicates when there is a CPC to TERC4 or a CPC to VDC data boundary (i.e a transition from the CTL period to the Data Island period, or a transition from a CTL period, to a Data period).

The decoders and the decode state machine can be implemented in accordance with a desired output format. In a number of embodiments, HDMI encoded data can be decoded to a format, similar to the format of decoded 8B10B encoded data, which facilitates mapping of the decoded data to XGMII. In a number of embodiments, the decoding of the HDMI encoded data applies the following rules:

VDC:
data encoded using VDC are encoded as data code groups Dx.y

GB:
GB(0100110011)=K28.1
GB(1011001100)=K28.5

TERC4:
TERC4={4'h0, TERC4} are encoded as data code groups Dx.y
TERC4(C,D,E,F) are encoded as K28.0, K28.3, K28.6, K23.7 for lane 0 at CPC-TERC4 & TERC4-CPC boundaries

CPC:
CPC(00,01,10,11)=K28.0, K28.3, K28.6, K23.7

As will be discussed further below, when the decoded data streams are mapped to XGMII, the sop signal can be used to indicate the location of ||C|| columns and ||D|| columns. The am signal indicates the CPC to VDC boundary for lane alignment. Although specific decoding techniques are indicated above, other rules can be used for decoding HDMI in accordance with embodiments of the invention that are appropriate to a specific output interface standard.

Note that the similarities between the DVI standard and the HDMI standard enable processes similar to those outlined herein to be used in the decoding of data encoded in accordance with the DVI standard.

Lane Alignment Blocks

Figure 10:
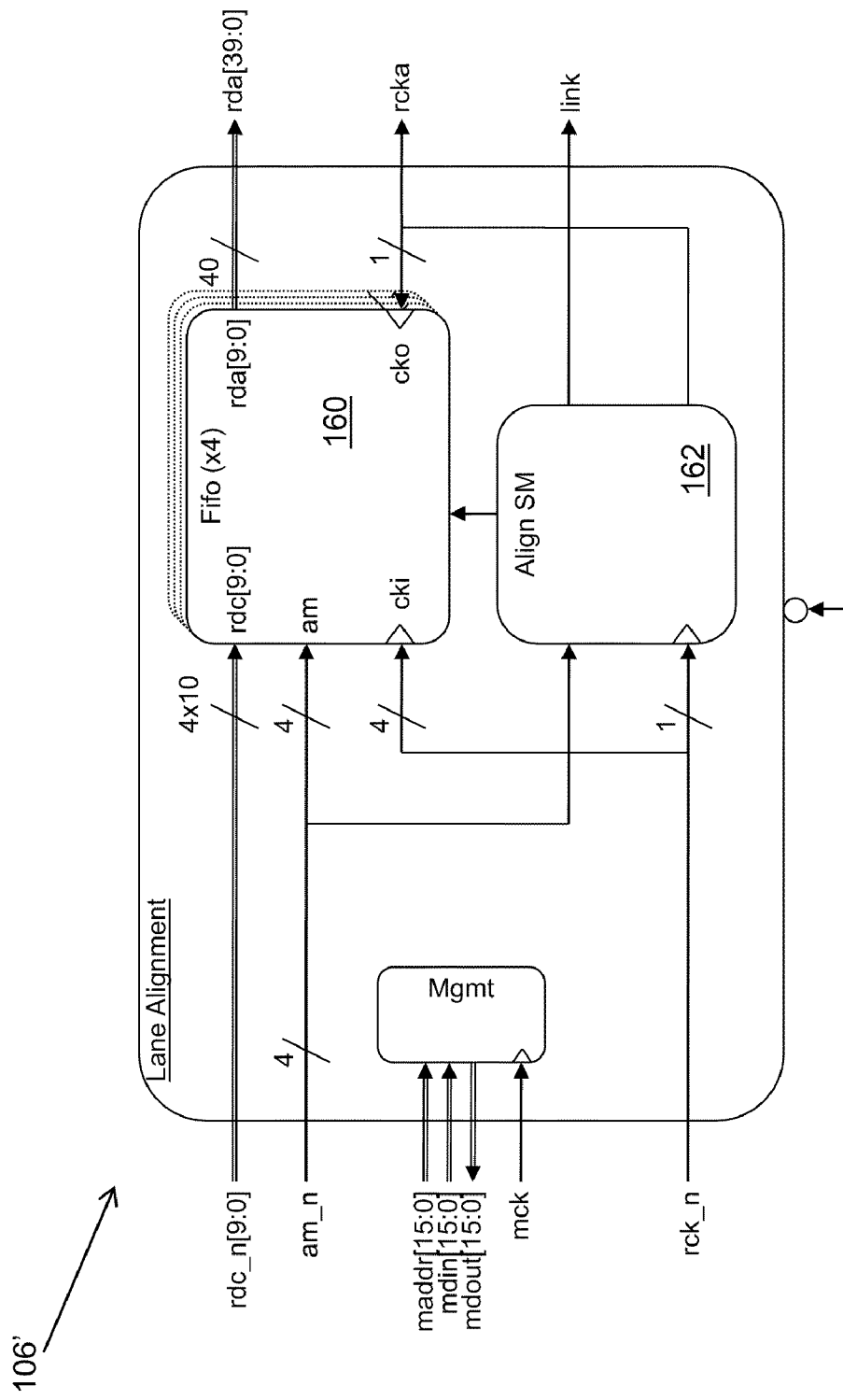
FIG. 10 is a block diagram of a lane alignment block in accordance with an embodiment of the invention.

Once the data has been decoded, the data is deskewed and aligned to enable mapping of the decoded data to a format suitable for transmission via a single lane. Many embodiments use the same implementation for the lane alignment block irrespective of the digital interface standard of the received data. A lane alignment block in accordance with an embodiment of the invention is shown in FIG. 10. The lane alignment block receives an input lane, and an am signal (see discussion above) from each of the byte sync and/or decoder blocks (not shown), and a clock signal associated with each lane. In the illustrated embodiment, four lanes are provide to a FIFO 160 that interleaves the data received via the four input lanes and outputs the interleaved data on a single lane. The FIFO 160 also outputs with a single clock signal. The four lanes are aligned by an alignment state machine, which uses the am and clock signals to perform the alignment.

Mapping Decoded Data to an Output Format

The composition of the single data stream output by the lane alignment block depends upon the digital interface standard used to encode the received data. In many embodiments, the output of the lane alignment block is desired to be mapped to a predetermined format compatible with the output lane of the digital interface translator. In a number of embodiments, the predetermined standard is XGMII. The nature of the mapping performed for received data formatted according to various digital interface standards is discussed below.

Mapping Decoded Display Port to XGMII

Due to the property of the decoded Display Port data the same type of code group is on each lane, the following columns can be defined:

||C||=/K$_0$x.y/K$_1$x.y/K$_2$x.y/K$_3$x.y/
||D||=/D$_0$x.y/D$_1$x.y/D$_2$x.y/D$_3$x.y/
||S$_{dp}$||=/S/D0.0/D0.0/D0.0/
||T$_0$||=/T/I/I/I/
||I||=/I/I/I/I/

The following rules can then be applied to the mapping of data code groups (Dx.y) and special code groups (Kx.y) to XGMII:

Insert ||S$_{dp}$|| in between ||C|| and ||D||
Insert ||T$_0$||, ||I|| in between ||D|| and ||C||
Pass ||C|| through without modification
Insert ||T$_0$||, ||I||, . . . , ||I||, ||S$_{dp}$|| in a sequence of ||D|| to rate match to 10.3125 GBaud
Insert ||I|| in a sequence of ||C|| to rate match to 10.3125 GBaud The mapping of decoded data, originally encoded according to the Display Port standard, using the rules outlined above in accordance with an embodiment of the invention is illustrated in FIGS. 11a and 11b. As can be seen from FIG. 11a, the code groups of the Display Port Decoded data in each lane are of the same type at any given time. Following the mapping, the data code groups in FIG. 11b are formatted as Ethernet packets with Idle columns inserted as necessary to match the 10.3125 GBaud output stream.

Display Port Mapper Blocks

Figure 12A:
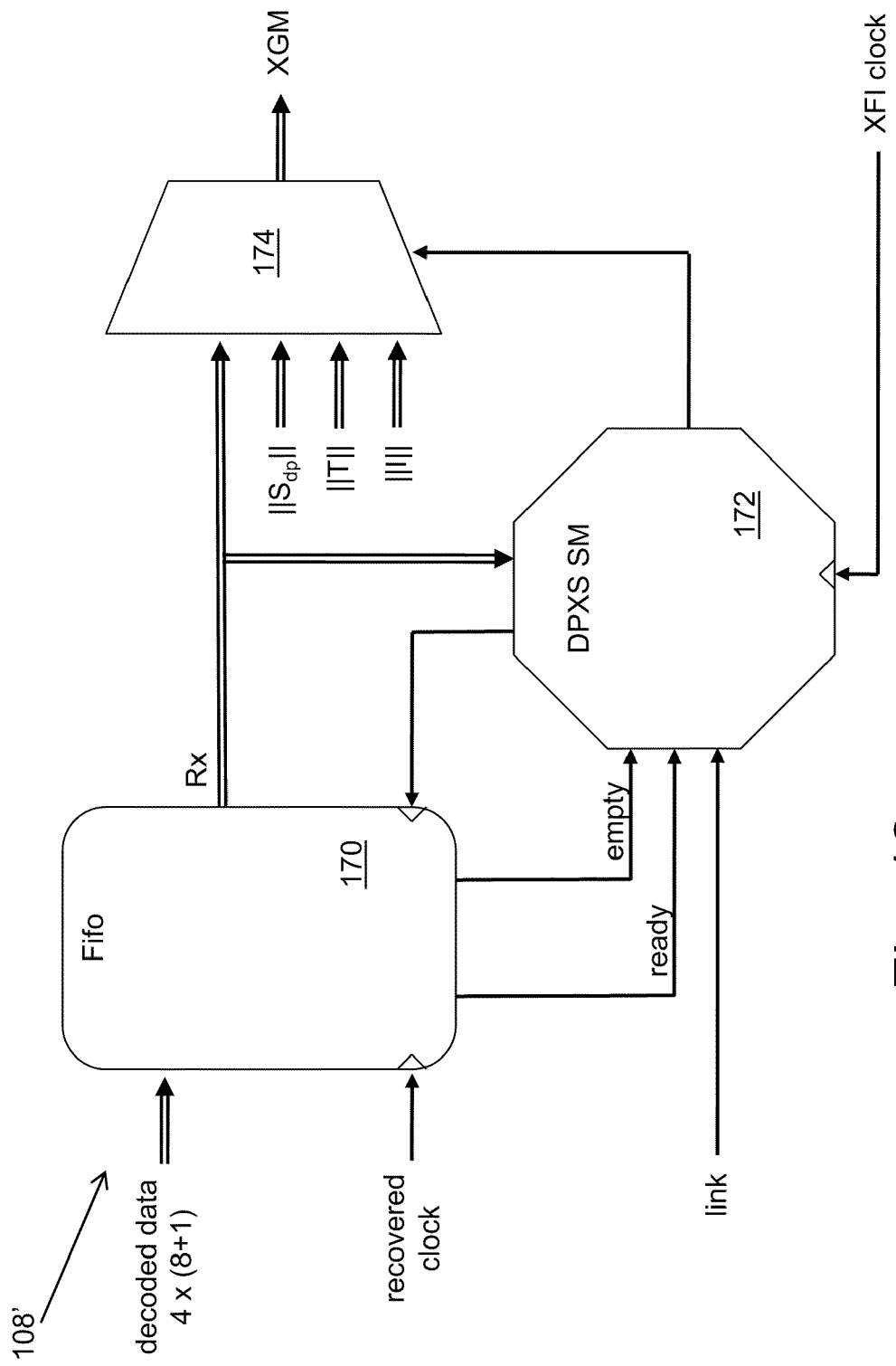
FIG. 12a is a block diagram of a Display Port mapper block in accordance with an embodiment of the invention.

A Display Port Rx mapper block that can map decoded Display Port data to XGMII in accordance with an embodiment of the invention is shown in FIG. 12a. The Display Port Rx mapper block 108' includes a FIFO 170 that accepts as inputs the decoded code groups and a clock signal and outputs either ||C|| or ||D|| columns in response to instructions from a digital port mapper state machine 172. The Display Port state machine 172 accepts as inputs a link signal from a lane alignment block, an XFI clock signal, a ready signal, which indicates that the write address pointer of the FIFO has incremented up and reached the read address pointer, and an empty signal, which indicates that the read address pointer of the FIFO has incremented up and reached the write address pointer. In addition to providing signals to the FIFO controlling the output of data, the Display Port state machine provides an input to a multiplexer 174 that selects between the FIFO output, $\|S_{dp}\|$, ||I||, or ||T|| as its output.

Figure 12B:
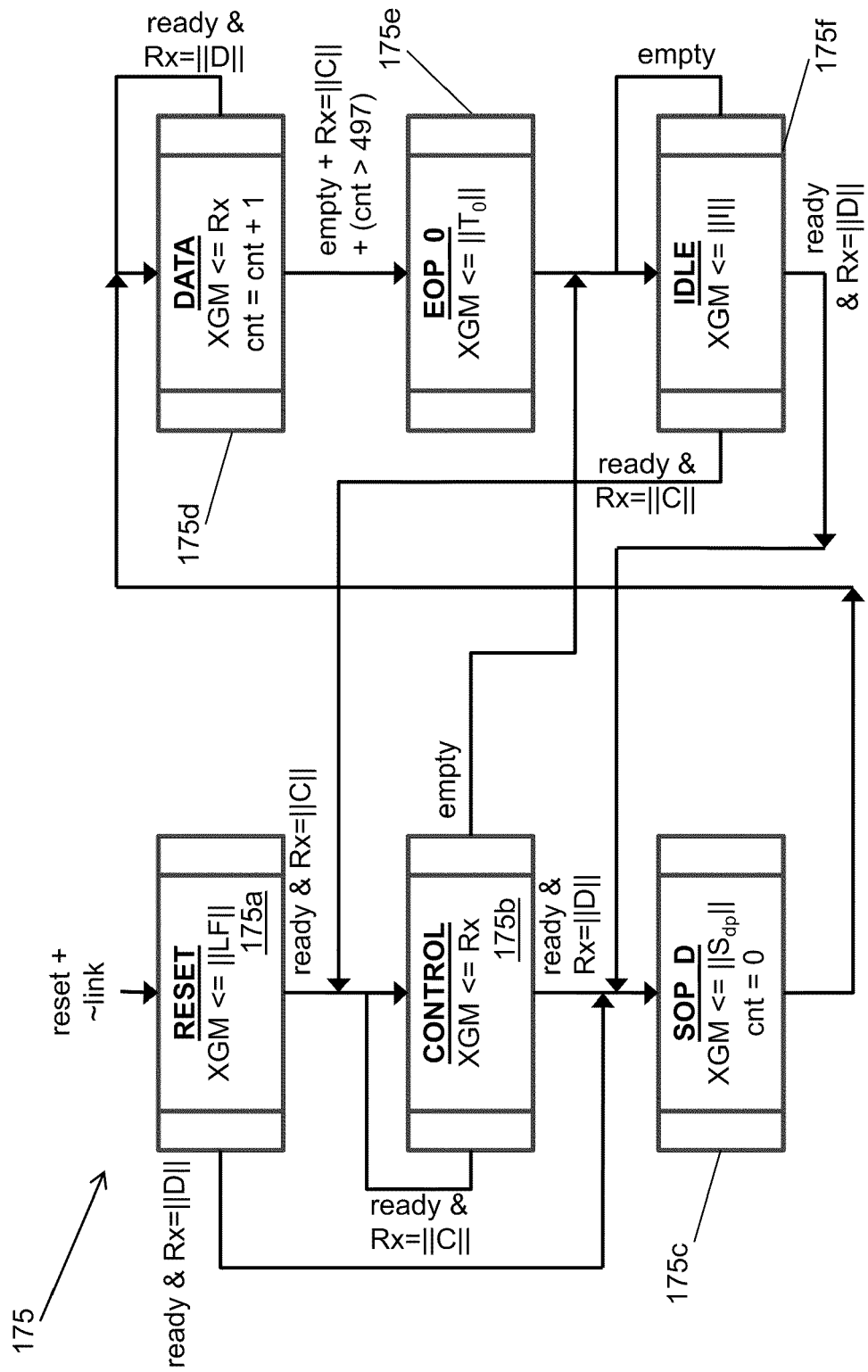
FIG. 12b is a state diagram for a Display Port mapping process in accordance with an embodiment of the invention.

The implementation of a Display Port state machine in mapping decoded Display Port data to XGMII in accordance with an embodiment of the invention can be understood with reference to the state diagram shown in FIG. 12b. The state machine 175 starts in the RESET state 175a and transitions based upon the output of the FIFO 170. When the FIFO outputs a ||C|| column, the state machine transitions to the CONTROL state 175b and causes Rx to be output as XGM. When the state machine is in the CONTROL state and the FIFO is empty, the state machine transitions to the IDLE state 175f and an Idle column (||I||) is output. In both the RESET 175a and CONTROL 175b states, the FIFO outputting a ||D|| column causes a transition to the SOP_D 175b state in which an $\|S_{dp}\|$ column is output (complying with rule an $\|S_{dp}\|$ be inserted between ||C|| and ||D||). A counter is initiated to 0 and the state machine transitions to the DATA 175d state with each new ||D|| column and the counter incremented. When the state machine is in the DATA 175d state and the FIFO 170 outputs a ||C|| column, the state machine transitions to the EOP_0 175e state, in which a $\|T_0\|$ column is output, and then the IDLE 175f state in which an ||I|| column is output (complying with the rule that $\|T_0\|$, and ||I|| columns be inserted between ||D|| and ||C|| columns). The state machine remains in the idle state until the FIFO 170 outputs either a ||C|| or ||D|| column. A ||C|| column results in a transition back to the CONTROL state 175b and a ||D|| column results in a transition back to the SOP_D state 175c. Although a specific state machine is illustrated in FIG. 12b, other implementations appropriate to a specific mapping scheme can be implemented in accordance with embodiments of the invention.

Mapping Decoded HDMI to XGMII

The variation in the number of input channels allowed by the HDMI standard results in a decoded data stream that is significantly more complicated to map to XGMII than decoded Display Port data. A mapping can be achieved in accordance with embodiments of the invention by applying the following definitions:

$\|C_0\|$=/$K_2$x.y/I/I/I/
$\|C_1\|$=/$K_1$x.y/$K_2$x.y/I/I/
$\|C_2\|$=/$K_0$x.y/$K_1$x.y/$K_2$x.y/I/
$\|C_3\|$=/$K_0$x.y/$K_1$x.y/$K_2$x.y/$K_0$x.y/,/$K_1$x.y/$K_2$x.y/$K_0$x.y/$K_1$x.y/, /$K_2$x.y/$K_0$x.y/$K_1$x.y/$K_2$x.y/
$\|D\|$=/$D_0$x.y/$D_1$x.y/$D_2$x.y/$D_0$x.y/,/$D_1$x.y/$D_2$x.y/$D_0$x.y/$D_1$x.y/, /$D_2$x.y/$D_0$x.y/$D_1$x.y/$D_2$x.y/
$\|S_{hv}\|$=/S/D0.0/D0.0/D0.1/, SOP for VDC data
$\|S_{ht}\|$=/S/D0.0/D0.0/D1.1/, SOP for Data Island TERC4 data
$\|T_0\|$=/T/I/I/I/
$\|I\|$=/I/I/I/I/

Given the above definitions, the mapping of HDMII to XGMII is completed in accordance with embodiments of the invention by applying the following rules:

Insert $\|S_{hv}\|$ in between $\|C_n\|$ and ||D|| where ||D|| is VDC data

Insert $\|S_{ht}\|$ in between $\|C_n\|$ and ||D|| where ||D|| is TERC4 data

Following ||S||, $1^{st}$ ||D||=/D0/D1/D2/D0/, $2^{nd}$ ||D||=/D1/D2/D0/D1/, $3^{rd}$ ||D||=/D2/D0/D1/D2/, etc.

Insert ||Tn||(n=0, 1, 2 or 3), ||I|| in between ||D|| and ||C||, $\|T_1\|$=/D2/T/I/I/, $\|T_2\|$=/D1/D2/T/I/, $\|T_3\|$=/D0/D1/D2/T/

After a ||Tn|| or ||I||1st ||C||=/C0/C1/C2/C0/, 2nd ||C||=/C1/C2/C0/C1/, 3rd ||C||=/C2/C0/C1/C2/, etc.

Last ||C|| before an ||I||, $\|S_{hv}\|$ or $\|S_{ht}\|$ to be padded with /I/ code groups, ||C||=/C0/C1/C2/I/,/C1/C2/I/I/, or /C2/I/I/I/

Insert ||T||, ||I||, . . . , ||I||, $\|S_{hv}\|$ or $\|S_{ht}\|$ as appropriate in a sequence of ||D|| to rate match to 10.3125 GBaud Insert ||Tn||, ||I||, . . . , ||I||, $\|S_{hv}\|$ or $\|S_{ht}\|$ as appropriate in a sequence of ||D|| to rate match to 10.3125 GBd Insert ||I|| in a sequence of ||C|| to rate match to 10.3125 GBd The mapping of decoded three channel. HDMI received data using the rules outlined above in accordance with an embodiment of the invention is illustrated in FIGS. 13a-13c. In the embodiment illustrated in FIG. 13a, the code groups of the decoded HDMI occupy three of the four input lanes of the digital interface translator. The mapping rules map the data groups to columns of four lanes and the data code groups are formatted as Ethernet packets. The XGMII data shown in FIG. 13b, shows the padding of the stream with Idle columns located after an Ethernet packet to achieve rate matching with the 10.3125 GBaud output lane of the digital interface translator. Although a specific HDMI port mapping is illustrated in FIG. 13b, alternative port mappings can be implemented in accordance with embodiments of the invention.

The XGMII data shown in FIG. 13c is an alternative mapper output where Idle columns have been inserted amongst special code groups to achieve rate matching with the 10.3125 GBaud output lane of the digital interface translator.

A further alternative mapper output is generated by defining:

$\|D_z\|$=/$D_0$x.y/$D_1$x.y/$D_2$x.y/$D_0$x.y/,/$D_1$x.y/$D_2$x.y/$D_0$x.y/$D_1$x.y/, /$D_2$x.y/$D_0$x.y/$D_1$x.y/$D_2$x.y/
$\|S_{hv}\|$=/S/D0.0/D0.0/D0.1/, SOP for VDC data
$\|S_{ht}\|$=/S/D0.0/D0.0/D1.1/, SOP for Data Island TERC4 data Given the above definitions, the alternative mapping of HDMII to XGMII is completed in accordance with embodiments of the invention by applying the following rules:

Insert $\|T_n\|$, ||I||, . . . , $\|S_{hv}\|$ in between $\|D_1\|$ and $\|D_0\|$, where $\|D_0\|$ is VDC data Insert $\|T_n\|$, ||I||, . . . , ||I||, $\|S_{ht}\|$ in between $\|D_1\|$ and $\|D_0\|$, where $\|D_1\|$ is non-VDC data Insert $\|T_n\|$, ||I||, . . . , ||I||, $\|S_{hv}\|$ or $\|S_{ht}\|$ as appropriate in a sequence of $\|D_z\|$ to rate match to 10.3125 GBd After any ||S|| 1st $\|D_z\|$=/$D_0$/$D_1$/$D_2$/$D_0$/, 2nd $\|D_z\|$=/$D_1$/$D_2$/$D_0$/$D_1$/, 3rd $\|D_z\|$=/$D_2$/$D_0$/$D_1$/$D_2$/, etc.

Although specific mappings are described above with respect to HDMI and XGM||, other mappings can be applied in accordance with embodiments of the invention as are appropriate to the formatting of the output channel of the digital interface translator. Implementations of HDMI Rx mapper blocks in accordance with embodiments of the invention are discussed below.

HDMI RX Mapper Blocks

Figure 14A:
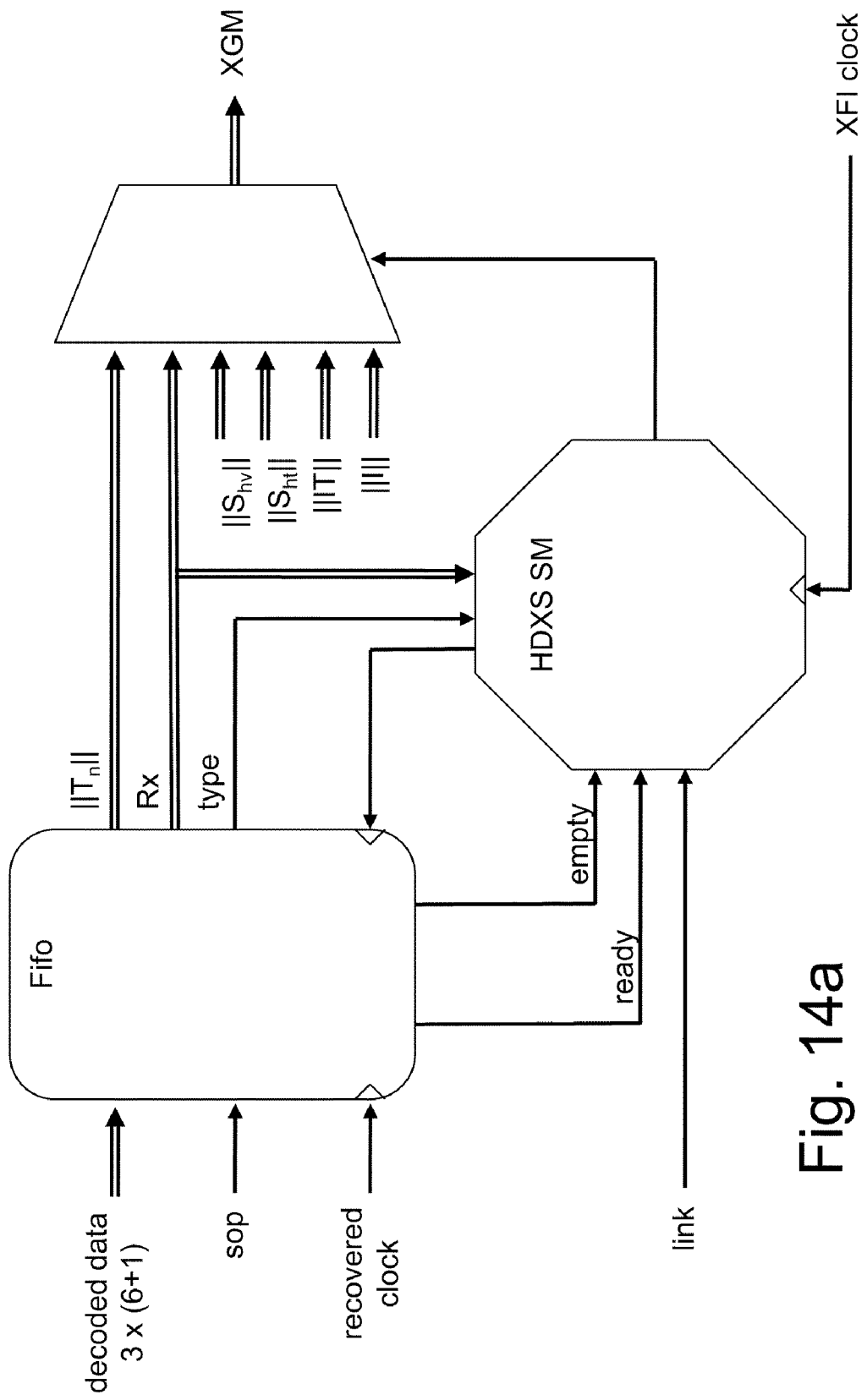
FIG. 14a is a block diagram of a HDMI mapper block in accordance with an embodiment of the invention.
Figure 14B:
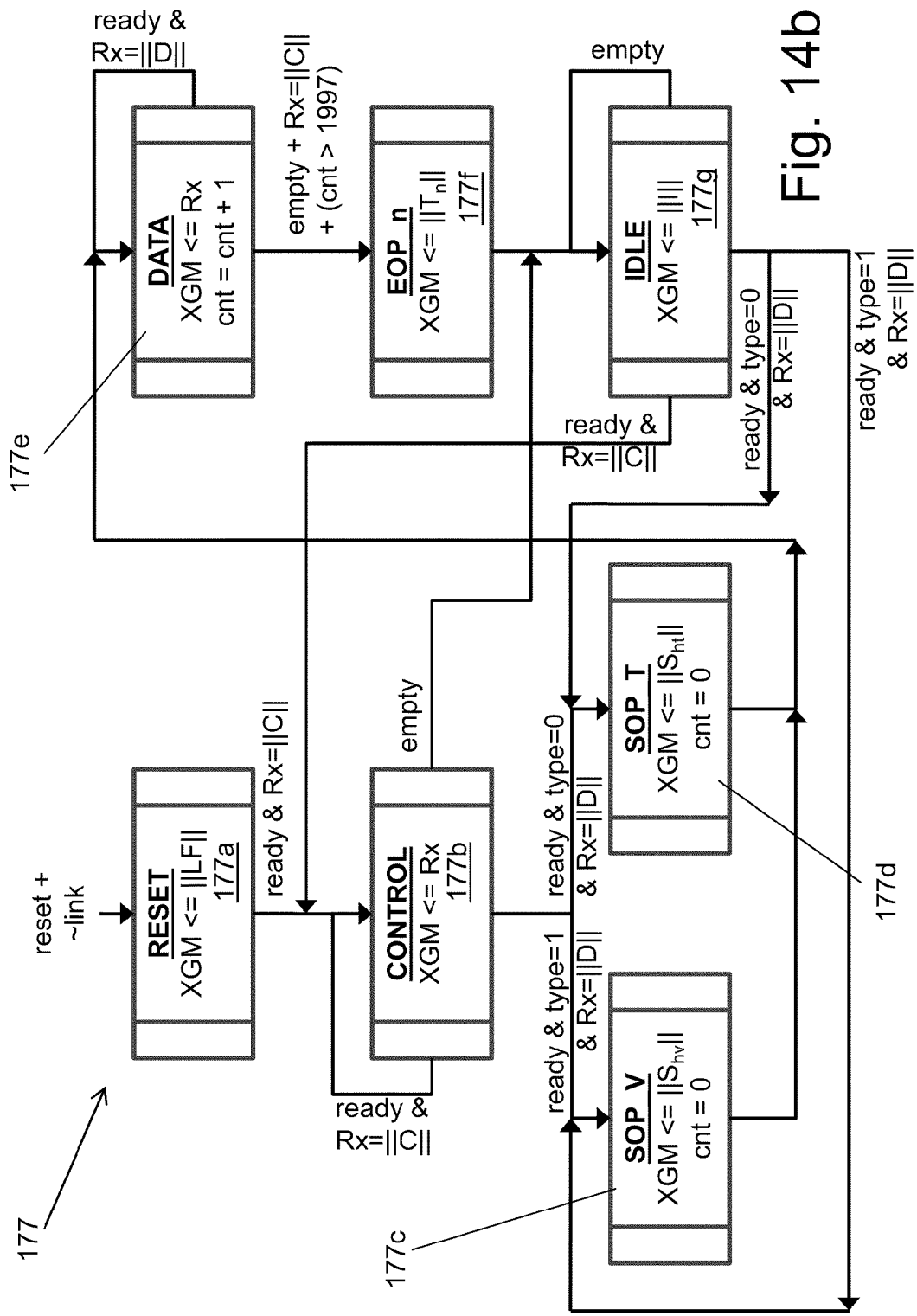
FIG. 14b is a state diagram for an HDMI mapping process in accordance with an embodiment of the invention.
Figure 14C:
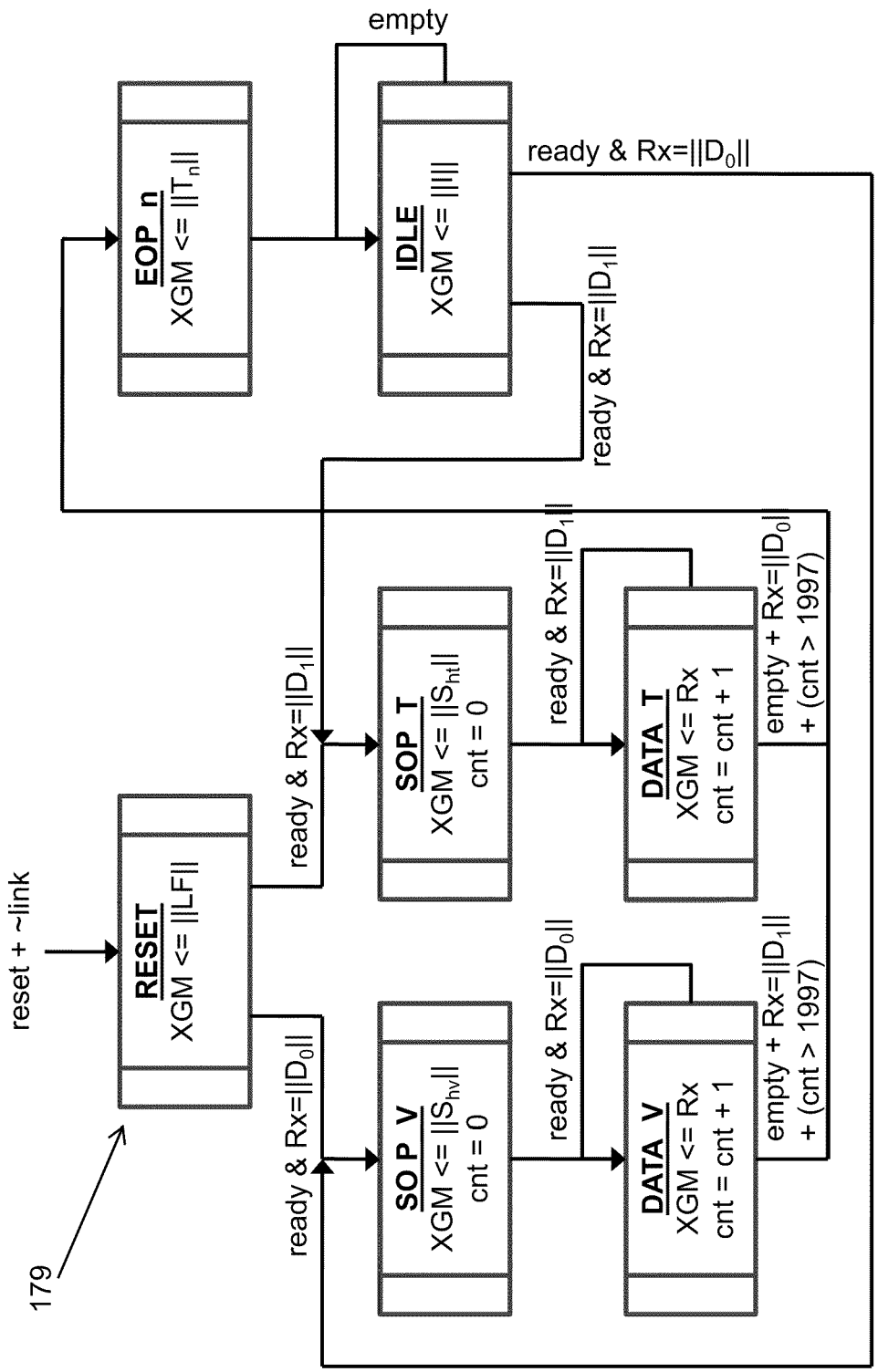
FIG. 14c is a state diagram for an alternative HDMI mapping process in accordance with an embodiment of the invention.

An HDMI Rx mapper block that can map decoded HDMI data to XGMII in accordance with an embodiment of the invention is shown in FIG. 14a. The basic structure of the HDMI Rx mapper block 108" is very similar to the Display Port Rx mapper block 108' shown in FIG. 12a. The differences include that the decoded data received by the FIFO 170' is from at most three channels of information, that the FIFO has an additional $\|T_n\|$ output, the multiplexer 174' includes $\|S_{hv}\|$ and an $\|S_{hd}\|$, and a different implementation of the state machine 172' is utilized. The implementation of the state machine can be understood with reference to the state diagram illustrated in FIG. 14b. The state machine 177 is similar to the state machine 175 shown in FIG. 12b with the exception that the state machine is configured such that the FIFO outputs a $\|C\|$ column, when the state machine is in the RESET state 177a. In addition, the state SOP_D 175c in FIG. 12b is split into the states SOP_V 177c and SOP_T 177d depending upon the value of the type output accompanying the $\|D\|$ column output. Although a specific state machine is illustrated in FIG. 14b, an alternative state machine can be utilized to implement an alternative mapping scheme in accordance with an embodiment of the invention. For example, the further alternative mapping scheme referenced above can be implemented utilizing the state machine 179, which is illustrated in FIG. 14c. In addition, a mapping block can be utilized that inserts auxiliary data instead of Idle columns, where auxiliary data is available.

Auxiliary Channel Arbiter Blocks

Figure 15:
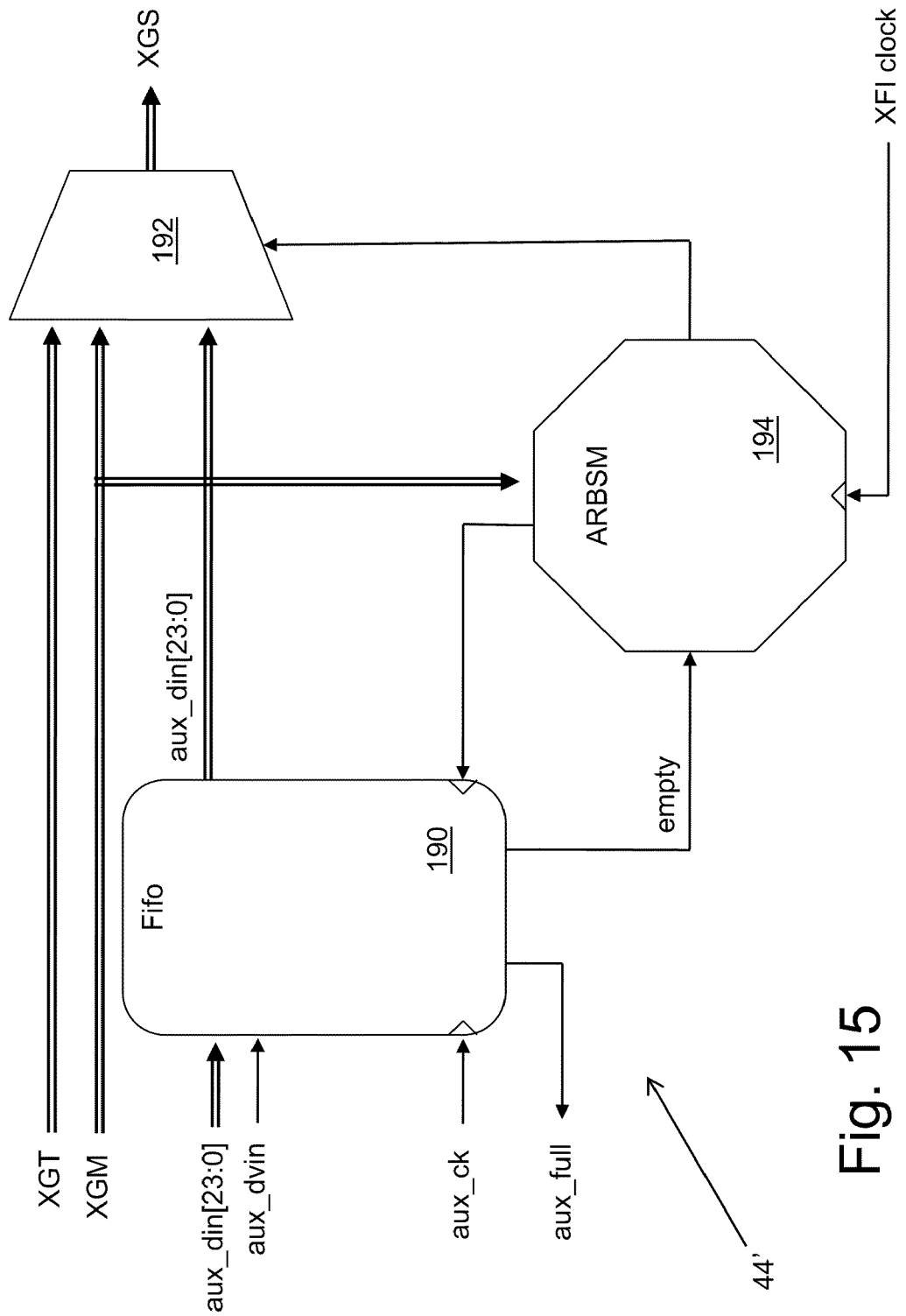
FIG. 15 is a block diagram illustrating an auxiliary channel arbiter block in accordance with an embodiment of the invention.

The single data stream output by the Rx mapper block includes additional capacity. The amount of additional capacity depends upon the digital interface standard used in the formatting of the received data. An arbiter block that can be used to insert auxiliary data into an XGMII data stream output by a Rx mapper block in accordance with an embodiment of the invention is illustrated in FIG. 15. The auxiliary block 44' receives an XGM input, an XGT input, data lines for receipt of auxiliary data, and an auxiliary clock. The auxiliary data lines connect to a FIFO 190. The FIFO provides an output to a multiplexer 192. The multiplexer also receives the XGT (test input) and XGM (XGMII input) inputs. An arbiter block state machine 194 monitors the XGMII data stream on the XGM input and controls the multiplexer to insert auxiliary data into Idle columns ($\|I\|$) in the XGMII data stream. In this way, the arbiter block is able to insert auxiliary data into the data stream created by the interleaved input channels.

Figure 16:
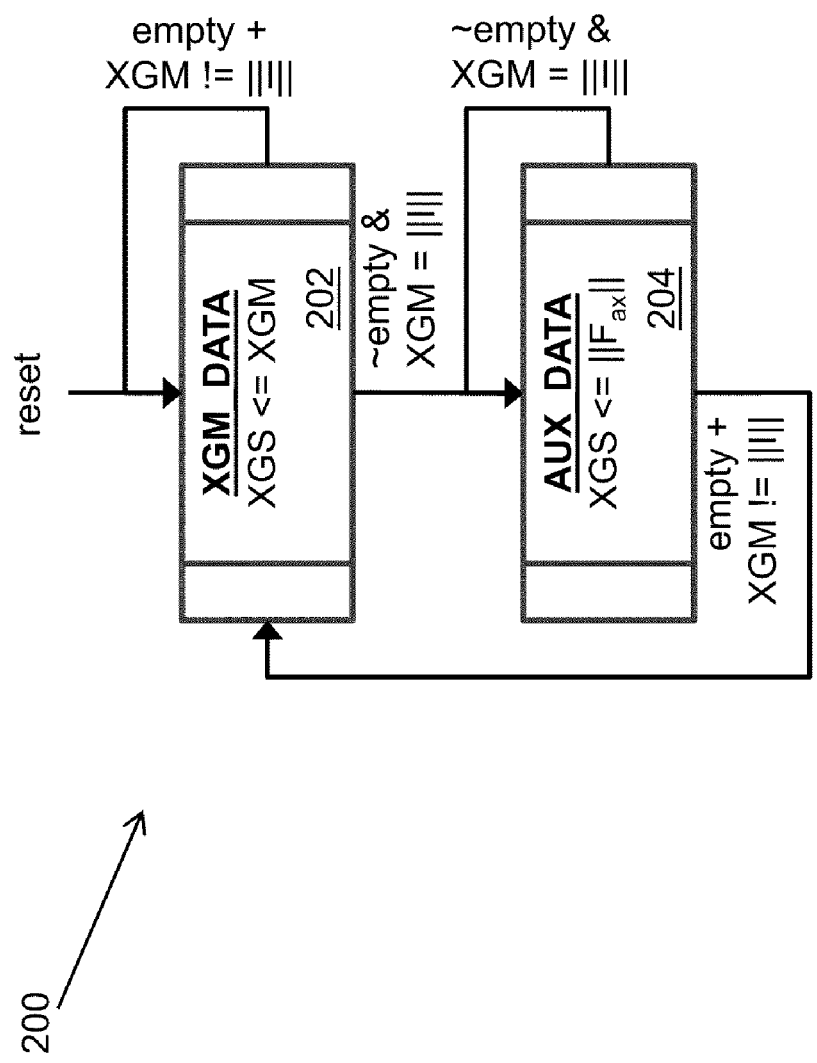
FIG. 16 is a state diagram illustrating an arbiter process in accordance with an embodiment of the invention.

The operation of the arbiter block state machine during the insertion of auxiliary data into the idle stream can be understood with reference to the state diagram shown in FIG. 16. The state machine 200 describes a process for inserting 3 bytes of auxiliary data into an $\|F_{ax}\|$ column to replace an $\|I\|$ column, where the $\|F_{ax}\|$ column is defined as /K8.2/D$_0$x.y/ D$_1$x.y/D$_2$x.y/. The $\|F_{ax}\|$ column has the same column definition as the $\|F_{sig}\|$ column defined in the IEEE 802.3 standard, Clause 48.

The state machine 200 can be reset to the XGM_DATA state 202. In this state, XGM is output as XGS. The state machine stays in the XGM_DATA state until XGM is an 11111 column and auxiliary data is available (i.e. ~empty), which causes a transition to the AUX_DATA state 204 in which XGS is selected as an $\|F_{ax}\|$ column from the FIFO 190. The state machine remains in the AUX_DATA state 204 until either XGM is no longer an $\|I\|$ column or there is no more auxiliary data. Although a specific state machine is illustrated in FIG. 16, other state machines can be utilized to insert auxiliary data into an idle stream in accordance with embodiments of the invention.

Single Lane TX Block

Figure 17:
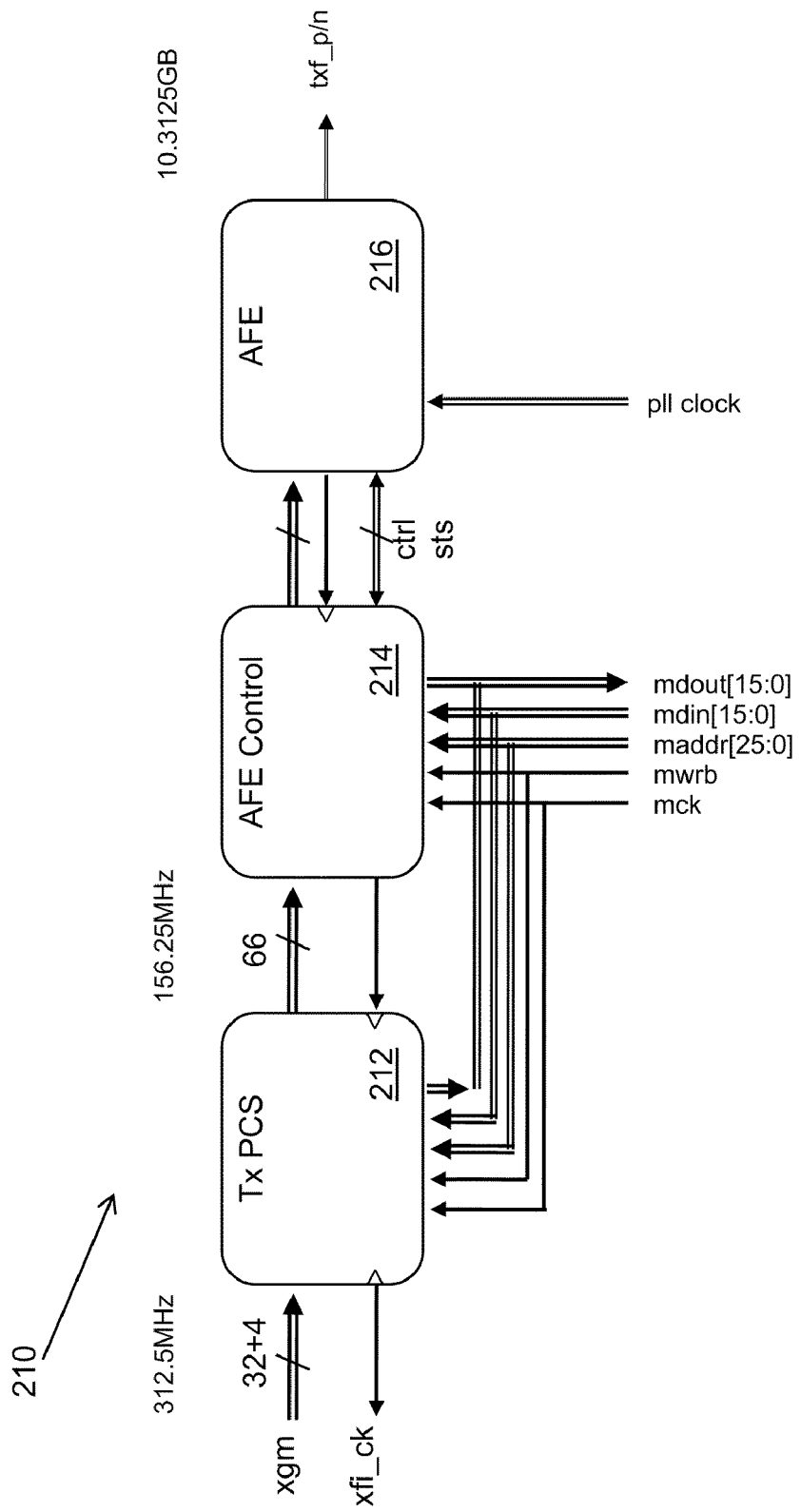
FIG. 17 is a block diagram of a single lane transmitter block in accordance with an embodiment of the invention.

The data stream output by an arbiter block is provided to a single lane Tx block of a single lane serdes in accordance with an embodiment of the invention. A single lane Tx block in accordance with an embodiment of the invention is shown in FIG. 17. The single lane Tx block 210 includes a transmit Physical Coding Sublayer block 212, an Analog Front End (AFE) controller block 214, and an Analog Front End (AFE) block 516. In embodiments where the arbiter block outputs an output data stream formatted in accordance with IEEE 802.3 Clause 49, the single lane Tx block can be implemented in accordance with any conventional design appropriate to the application.

The Receive High Speed Path

A receive high speed path of a digital interface translator in accordance with an embodiment of the invention involves performing the inverse operations to those described above with respect to the transmit high speed path. Components of receive high speed paths and their operation in accordance with various aspects of the invention can be understood by reviewing FIGS. 18-25.

Figure 18:
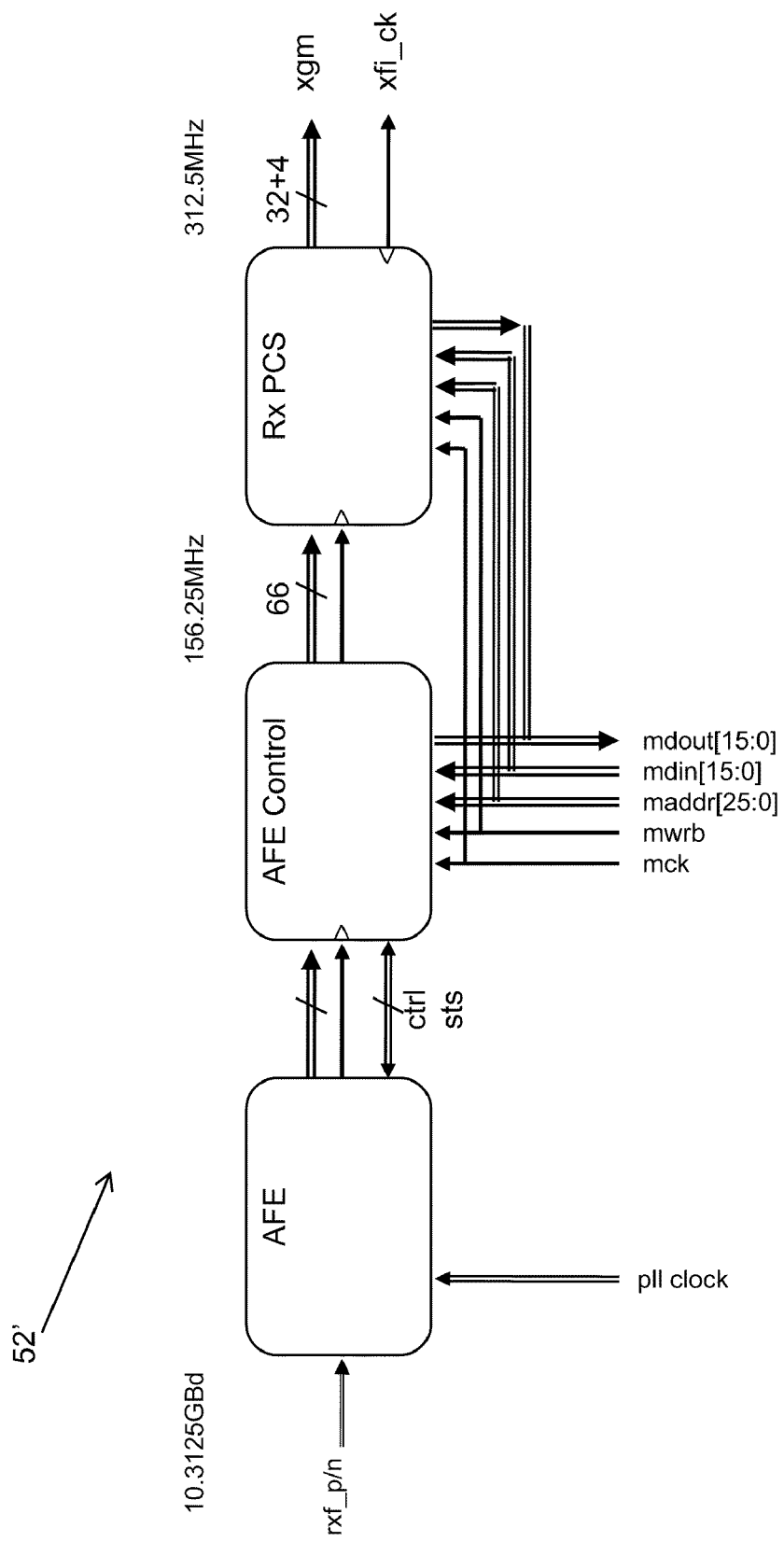
FIG. 18 is a block diagram of a single lane receiver block in accordance with an embodiment of the invention.

A single lane receiver in accordance with an embodiment of the invention is illustrated in FIG. 18. The single lane receiver 52' shown in FIG. 18 is similar to a single lane of the multilane receiver 48' shown in FIG. 5 with the exception that the implementations are designed to accommodate the specific formatting of the input data stream. In many embodiments, the single lane receiver receives input data stream formatted per IEEE 802.3 Clause 49. In other embodiments, the single lane receiver is configured to receive another input data stream in accordance with the requirements of a specific application.

Figure 19:
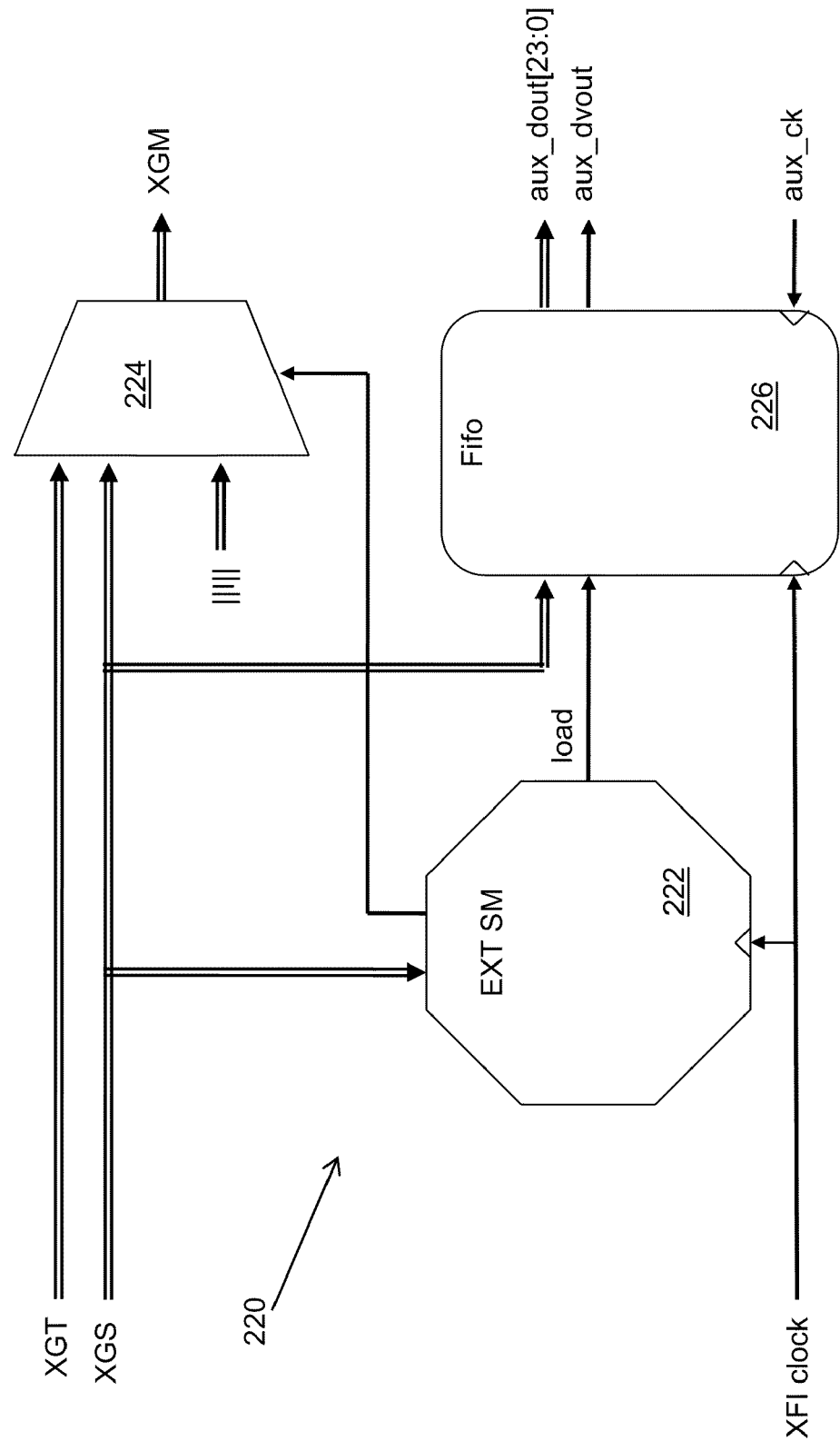
FIG. 19 is a block diagram of an auxiliary channel extractor block in accordance with an embodiment of the invention.
Figure 20:
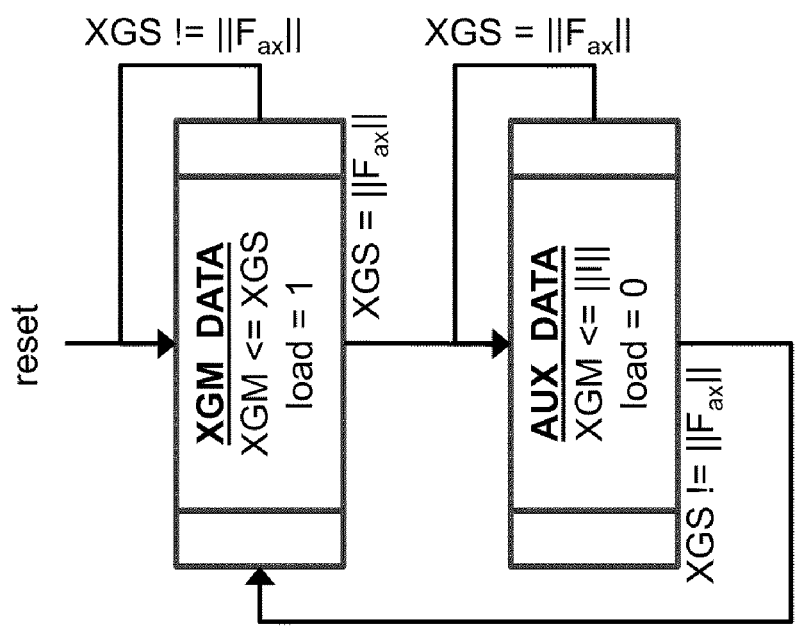
FIG. 20 is a state diagram of an extractor process in accordance with an embodiment of the invention.

Auxiliary data is extracted from the decoded input data stream. An Auxiliary Channel Extractor block that can be used to extract an auxiliary data channel from an IEEE 802.3 Clause 49 input data stream in accordance with an embodiment of the invention is illustrated in FIG. 19. The Auxiliary Channel Extractor block 12 extracts $\|F_{ax}\|$ columns and replaces them with idle columns. A state machine 222 is used to control the selection of columns using the multiplexer 224 and to load auxiliary data into a FIFO 226. A state diagram illustrating a state machine 230 that can be used to select the columns to output directly and the columns to output on an auxiliary data channel in accordance with an embodiment of the invention is illustrated in FIG. 20.

Figure 21:
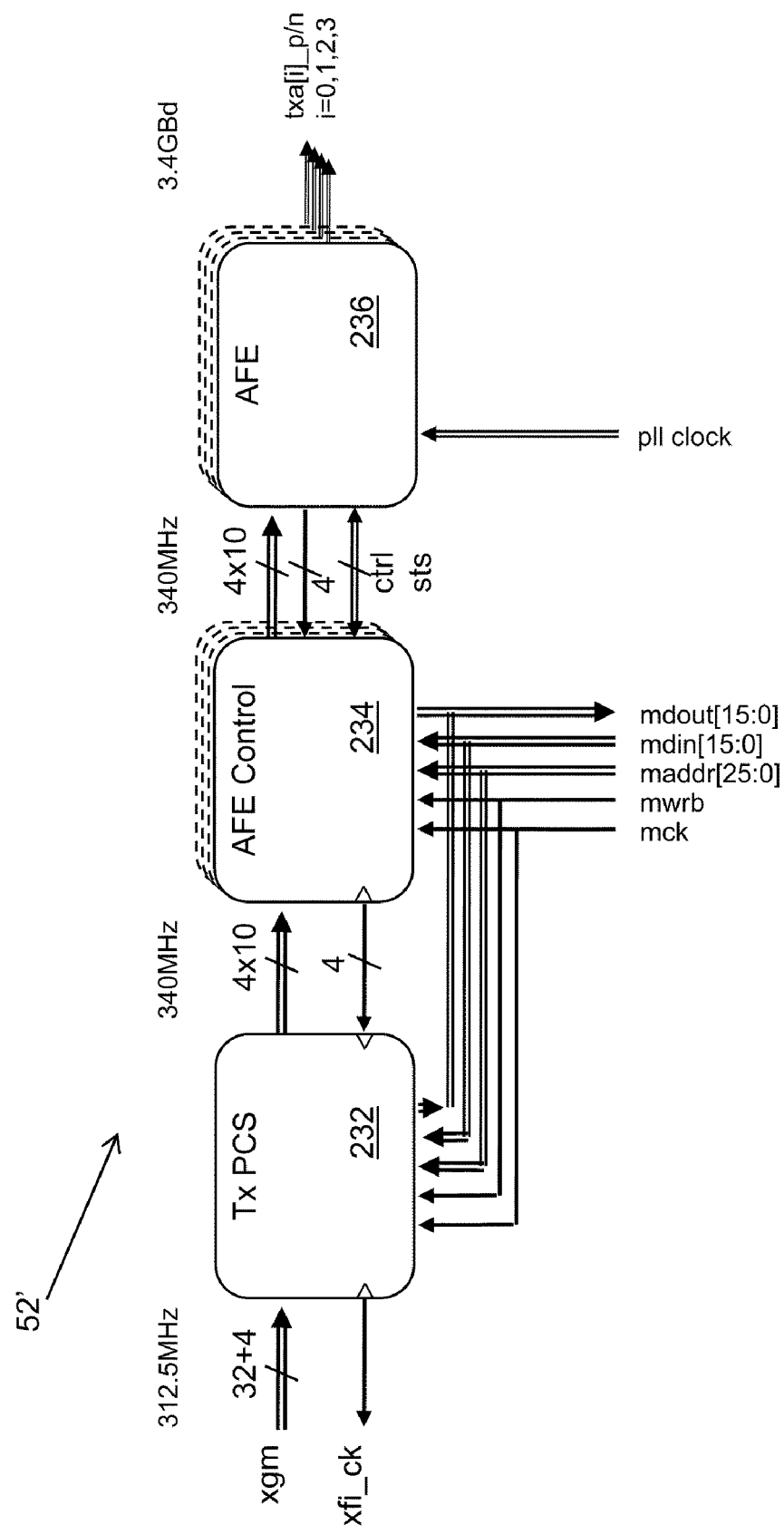
FIG. 21 is a block diagram of a Multilane Transmitter block in accordance with an embodiment of the invention.
Figure 22:
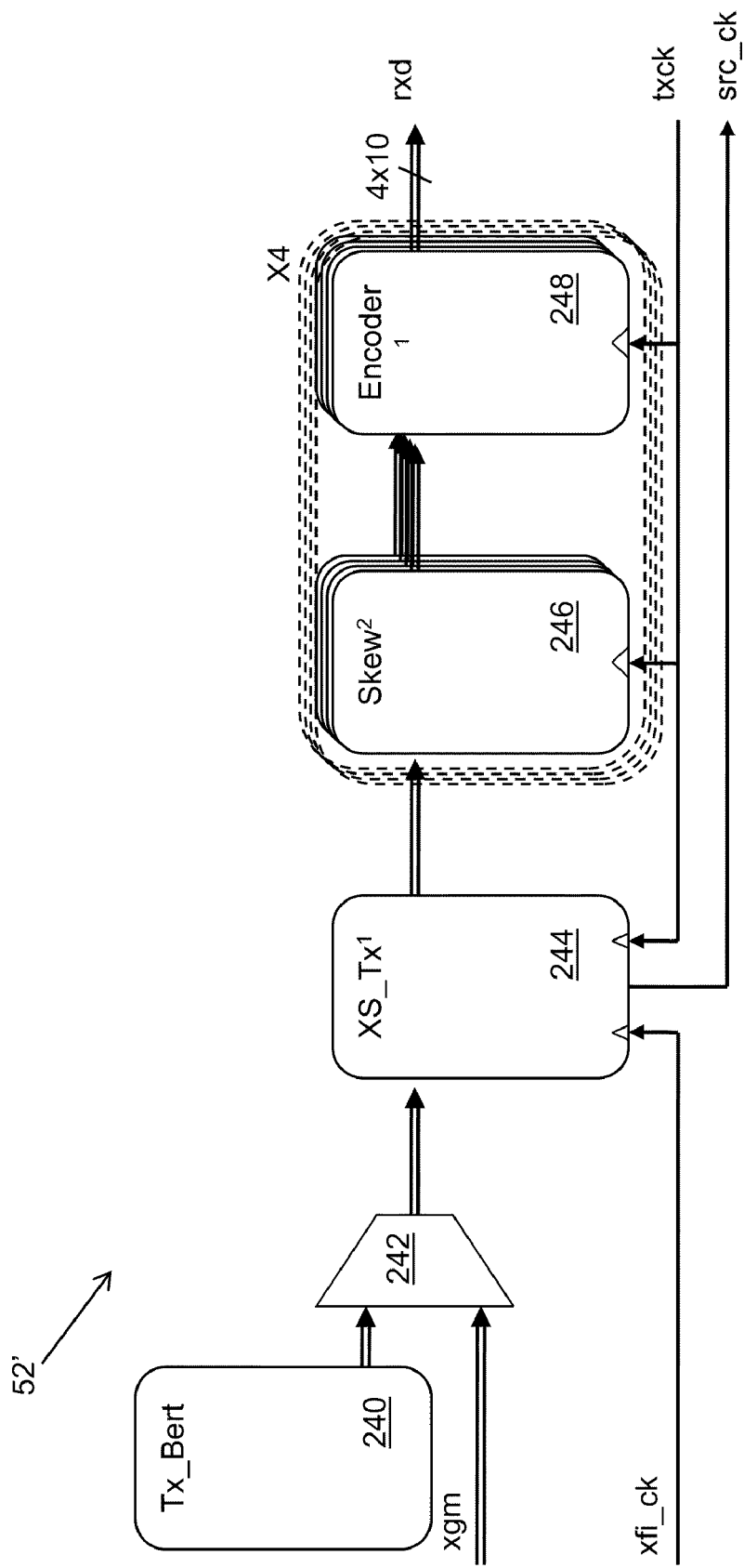
FIG. 22 is a block diagram of a Multilane Transmitter PCS block in accordance with an embodiment of the invention.

Once the auxiliary data channel has been extracted, the data stream is passed to a multilane transmitter block. A multilane transmitter block in accordance with an embodiment of the invention is illustrated in FIG. 21. The multilane transmitter block 52' includes a transmitter physical coding sub-layer (PCS) block 232, a plurality of AFE Control blocks 234, and AFE blocks 236. A multilane PCS block in accordance with an embodiment of the invention is illustrated in FIG. 22. The multilane transmitter block 232' includes a Transmitter bit error rate testing (BERT) block 240, a multiplexer 242, a Transmit Mapper block 244 that provides a multiple channel output and an output clock signal. Each of the multiple channels output by the Transmit Mapper block 244 are provided to a skew block 246 and an encoder block 248. Part or all of the blocks shown in FIG. 22 are mode dependent.

Figure 23A:
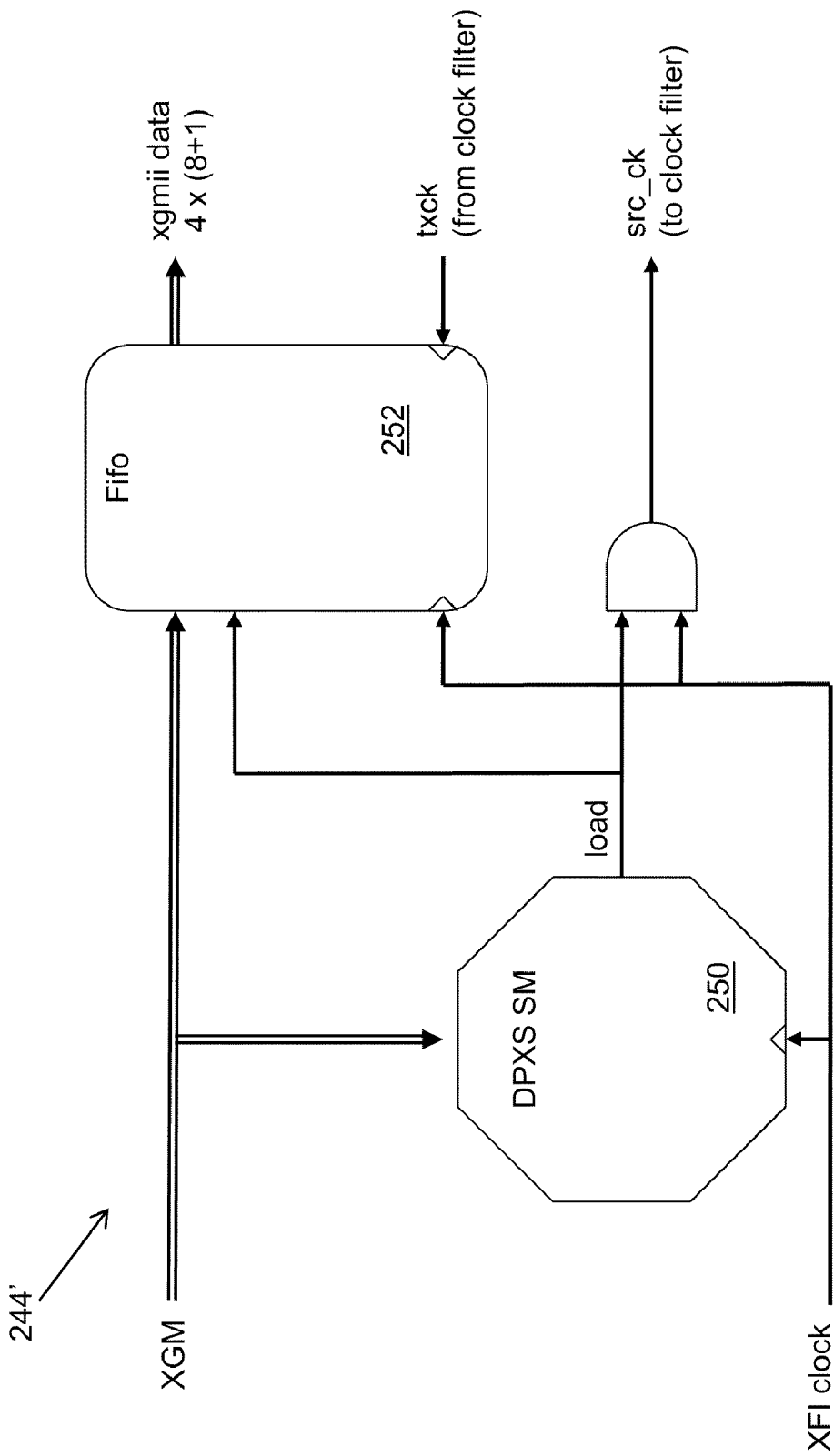
FIG. 23a is a block diagram of a Display Port Transmitter Mapper block in accordance with an embodiment of the invention.
Figure 23B:
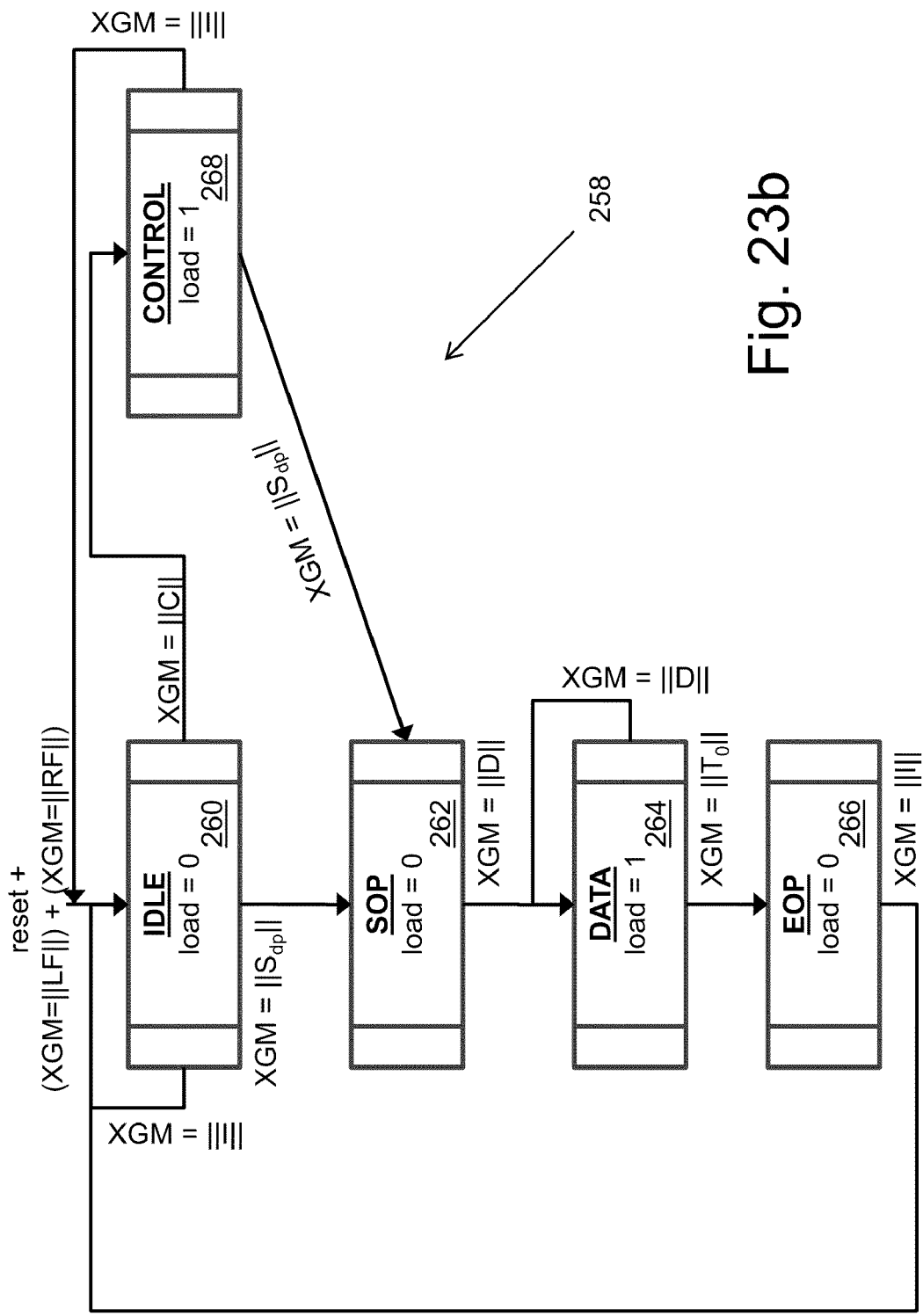
FIG. 23b is a state diagram of a Display Port Transmitter process in accordance with an embodiment of the invention.

A Transmit Mapper block 244' suitable for use in extracting Display Port data from an XGMII input stream is illustrated in FIG. 23a. A state machine 250 controls the loading of data from XGM into a FIFO 252. Data is clocked into the FIFO at the output rate. A state diagram for the state machine 250 in accordance with an embodiment of the invention is illustrated in FIG. 23b. The state diagram 258 indicates that the state machine resets to the IDLE state 260. In the idle state, the next transition depends upon the column on XGM.

In the event that XGM is a ‖C‖ column, then the state machine transitions to the CONTROL state 268 and the ‖C‖ column is loaded into the FIFO. An ‖I‖ column results in a transition back to the IDLE state 260. The ‖I‖ columns are discarded (i.e. load=0). In either the IDLE state 260 or the CONTROL state 268, an ‖S$_{dp}$‖ column results in a transition to the Start of Packet (SOP) state 262. The ‖S$_{dp}$‖ column is dropped (i.e. load=0), and the subsequent ‖D‖ column causes a transition to the DATA state 264 and the ‖D‖ column is loaded into the FIFO 252 (i.e. load=1). The DATA state 264 persists until. XGM is a ‖T$_0$‖ column, which prompts a transition to the End of Packet (EOP) state 266. The ‖T$_0$‖ column is discarded and subsequent ‖I‖ columns are discarded by transitioning to the IDLE state 260. Although a specific state machine is shown in FIG. 23b for the generation of output data streams conforming to the Display Port specification, other state machines can be utilized to extract ‖C‖ and ‖D‖ columns in accordance with embodiments of the invention.

Figure 24A:
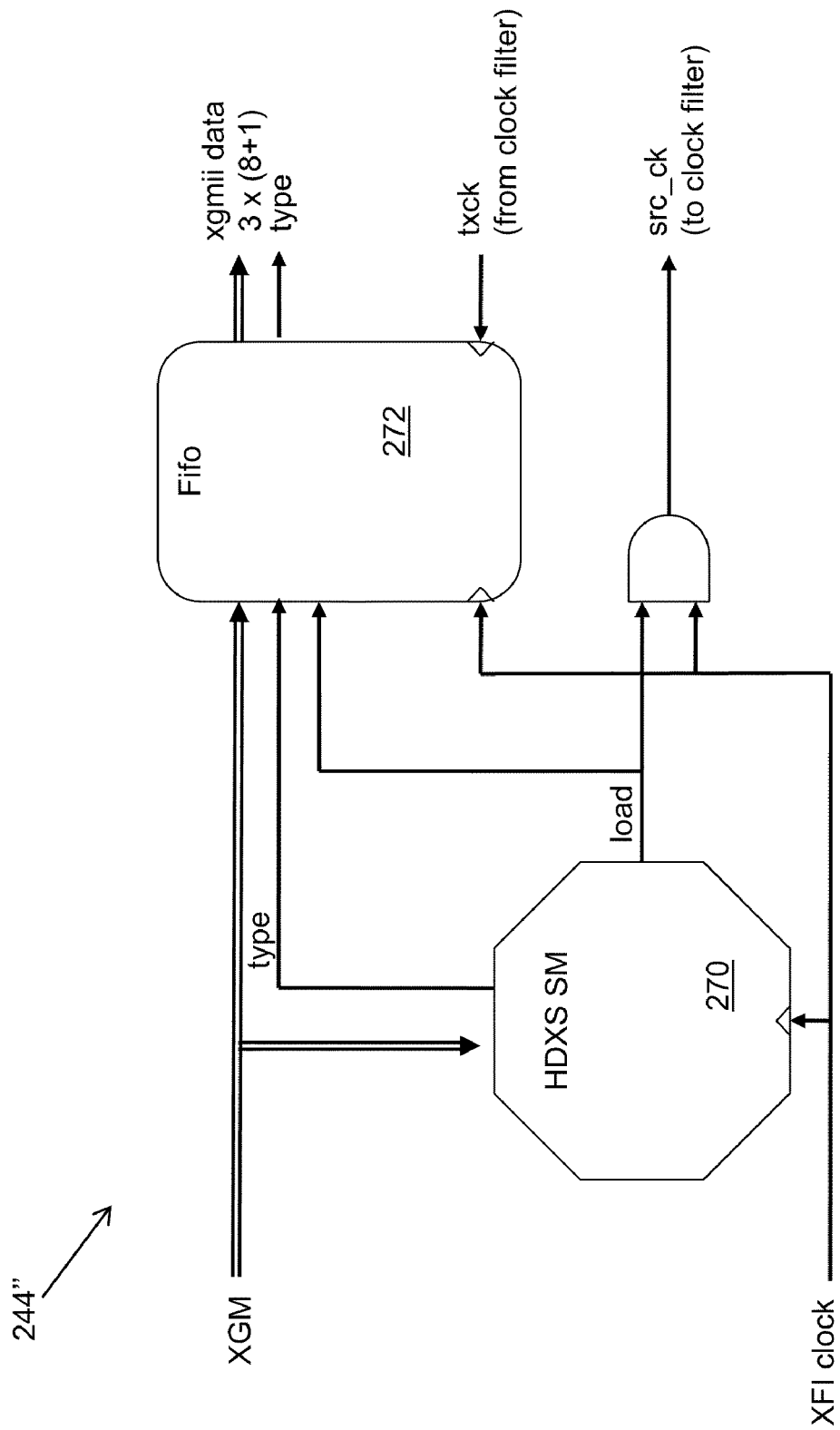
FIG. 24a is a block diagram of a HDMI Transmitter Mapper block in accordance with an embodiment of the invention.
Figure 24B:
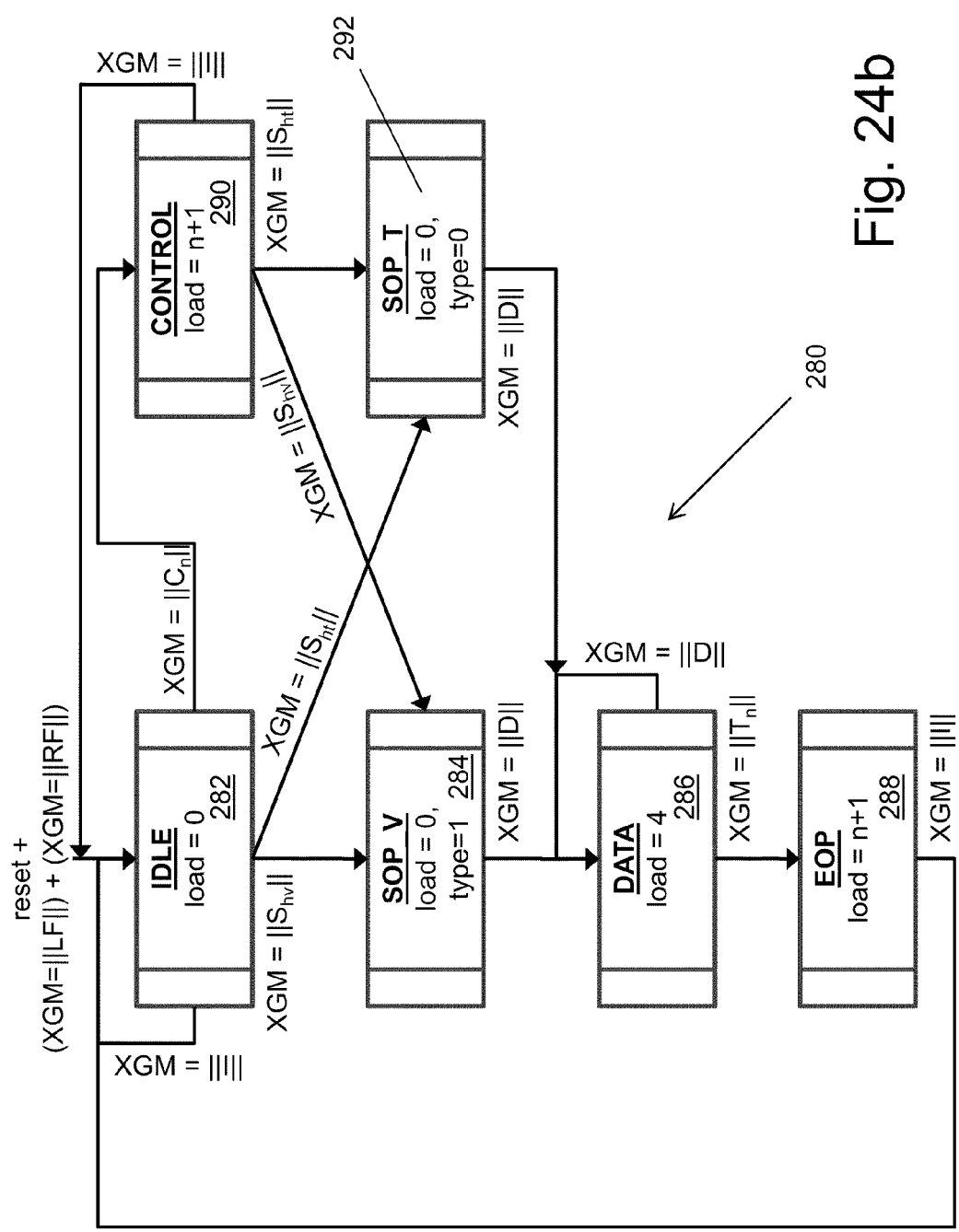
FIG. 24b is a state diagram of an HDMI Transmitter process in accordance with an embodiment of the invention.

A Transmit Mapper block suitable for use in extracting HDMI data from an XGMII input stream is illustrated in FIG. 24a. The Transmit Mapper block 244″ also includes a state machine 270 and a FIFO 272. The load signal indicates when and how many XGM data bytes to write into the FIFO. The type signal identifies the type of data field, 0=TERC4, 1=VDC. The FIFO input rate is the same as the FIFO output rate, because the Tx clock is derived from and is the average frequency of the src_ck signal. A state diagram for the state machine 270 in accordance with an embodiment of the invention is illustrated in FIG. 24b. The state diagram 280 indicates that the state machine resets to the IDLE state 282. Receipt of a ‖C$_n$‖ column in the IDLE state 282, results in a transition to the CONTROL state 290 and n+1 bytes of data are loaded into the FIFO 272. An ‖I‖ column results in a transition back to the IDLE state 282, and the ‖I‖ column is discarded. In either the IDLE state 282 or the CONTROL state 290, an ‖S$_{hv}$‖ column will result in a transition to a Start of VDC Packet (SOP_V) state 294 and an ‖S$_{ht}$‖ column will result in a transition to the Start of TERC4 Packet (SOP_T) state 292. Both the |S$_{hv}$| and |S$_{ht}$| columns are discarded, and a subsequent ‖D‖ column results in a transition to the DATA state 296 and the loading of 4 bytes of data into the FIFO. The type of DATA is set dependent upon the state from which the state machine transitioned from to the DATA state. The SOP_V state sets type to 0 and the SOP_T state sets type to 1. The DATA state persists as long as ‖D‖ columns are present for loading into the FIFO 272. When a ‖T$_n$‖ column is presented on XGM, then a transition to the End of Packet (EDP) state 288 occurs and n+1 bytes of data are loaded into the FIFO. Following the ‖T$_n$‖ column, an ‖I‖ column is expected and is discarded as part of a return to the IDLE state 282. Although a specific state diagram is illustrated in FIG. 24b, other state machines can be implemented in accordance with the requirements of a specific application in accordance with embodiments of the invention.

Figure 25:
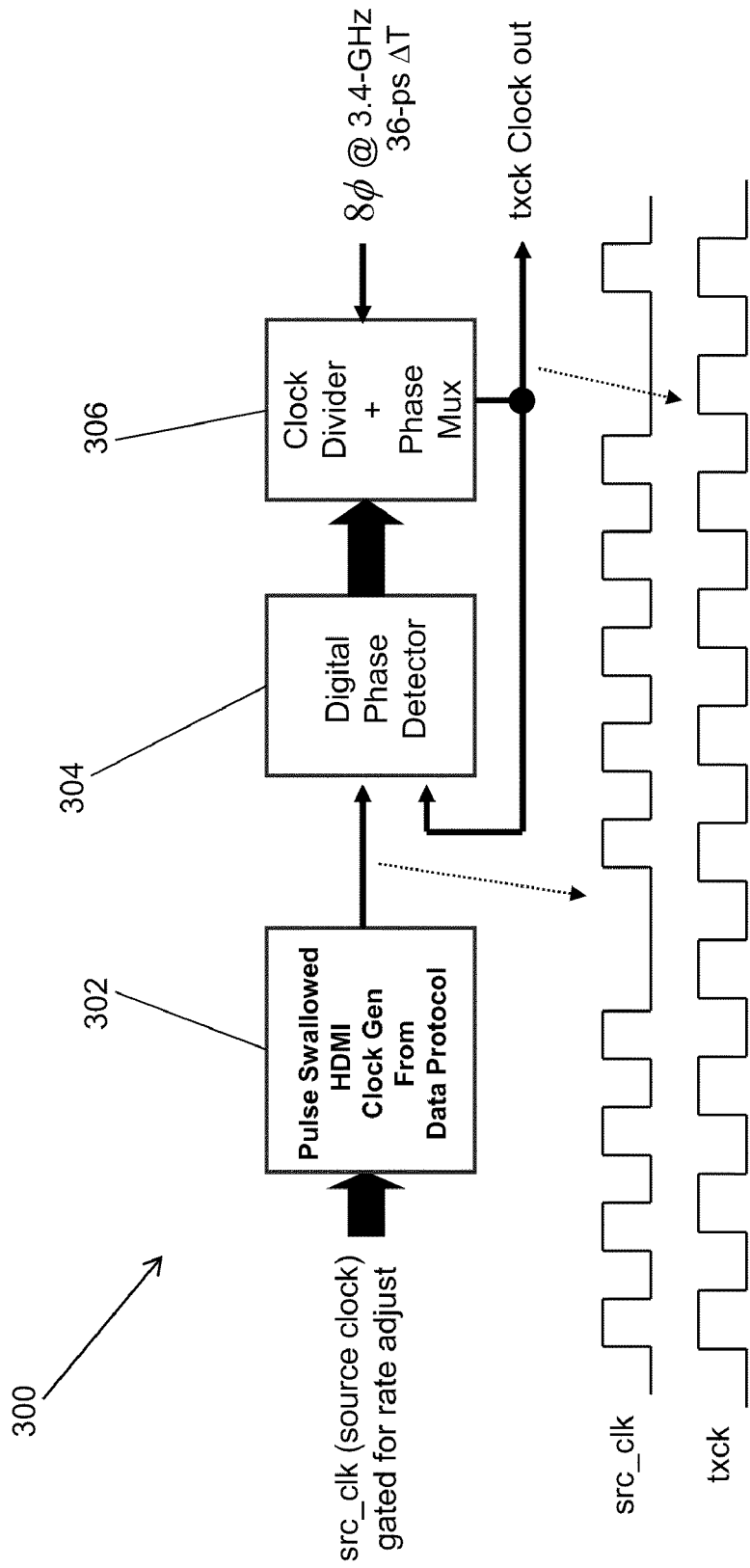
FIG. 25 is a block diagram of a circuit used for clock recovery in accordance with an embodiment of the invention.

Referring back to FIGS. 23a and 24a, in each Transmitter Mapper block a clock signal (src_clk) is generated that is the AND of the XFI clock and the load signal used to load data into the FIFO. The txck signal is used to clock data out of the FIFO at the same rate it is input to the FIFO. A sink-side clock regeneration block that can be used to generate a txck signal that is the average of the src_clk signal for use in an HDMI Transmitter Mapper block in accordance with an embodiment of the invention is shown in FIG. 25. The sink-side clock regeneration block includes a Pulse Swallowed HDMI Clock 302, which is generated from the data protocol. The Puke Swallowed HDMI Clock is passed to a Digital Phase Detector 304, which provides an output to a clock divider and phase multiplexer block 306. The clock divider and phase multiplexer block 306 generates the txck output, which is used to clock data out of a FIFO in a Transmitter Mapper block. Although a specific sink-side clock regeneration block is shown in FIG. 25, other sink-side clock regeneration blocks can be utilized as appropriate for specific applications in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A multilane to single lane digital interface translator, comprising:
multiple receiver lanes, where at least one of the receiver lanes is configured to receive a data channel at a first data rate and encoded in accordance with an input digital interface standard using a coding scheme;
an auxiliary channel input configured to receive an auxiliary data channel; and
a single transmitter lane configured to output a single data channel at a second data rate and encoded in accordance with an output digital interface standard;
wherein the multilane to single lane digital interface translator is configured to encode the received data to produce code groups, where the same type of code group is on each lane at any given time, and the type of the code group is determined by the coding scheme used to encode the received data;
wherein the multilane to single late digital interface translator is configured to interleave the code groups by mapping the code groups to packets, where each packet includes a specific type of code group;
wherein the multilane to single lane digital interface translator is configured to insert auxiliary data received via the auxiliary channel input and idle data between the packets to produce an output data stream that is rate matched to the second data rate; and
wherein the multilane to single lane digital interface translator is configured to encode the output data stream in accordance with the output digital interface standard.

2. The digital interface translator of claim 1, wherein the multiple receiver lanes are configurable to decode data channels encoded in accordance with one of a plurality of digital interface standards.

3. The digital interface translator of claim 1, wherein the output digital interface standard is the 10 Gigabit IEEE 802.3 Clause 49 standard.

4. The digital interface translator of claim 1, wherein the input digital interface standard is the Display Port standard.

5. The digital interface translator of claim 4, wherein the digital interface translator is configured to utilize the following definitions:
‖C‖=K$_0$x.y/K$_2$x.y/K$_2$x.y/K$_3$x.y/
‖D‖=D$_0$x.y/D$_1$x.y/D$_2$x.y/D$_3$x.y/
‖S$_{dp}$‖=/S/D0.0/D0.0/D0.0/
‖T$_0$‖=/T/I/I/I/, defined in IEEE 802.3 Clause 48
‖I‖=/I/I/I/I/, defined in IEEE 802.3 Clause 48
to map decoded data code groups Dx.y and decoded special code groups Kx.y to XGMII according to the following rules:
insert ‖S$_{dp}$‖ in between ‖C‖ and ‖D‖;
insert ‖T$_0$‖, ‖I‖ in between ‖D‖ and ‖C‖;
pass ‖C‖ through without modification;

insert $\|T_0\|$, $\|I\|$, ..., $\|I\|$, $\|S_{dp}\|$ in a sequence of $\|D\|$ to rate match to the output digital interface standard; and insert $\|I\|$ in a sequence of $\|C\|$ to rate match to the output digital interface standard.

6. The digital interface translator of claim 5, wherein the digital interface translator is configured to replace $\|I\|$ columns with auxiliary data received via the auxiliary channel.

7. The digital interface translator of claim 1, wherein the input digital interface standard is the HDMI standard.

8. The digital interface translator of claim 7, wherein the digital interface translator is configured to utilize the following definitions:

$\|C_0\|$=/K$_2$x.y/I/I/I/

$\|C_1\|$=/K$_1$x.y/K$_2$x.y/I/I/

$\|C_2\|$=/K$_0$x.y/K$_1$x.y/K$_2$x.y/I/

$\|C_3\|$=/K$_0$x.y/K$_1$x.y/K$_2$x.y/K$_0$x.y/K$_1$x.y/K$_2$x.y/K$_0$x.y/K$_1$x.y/, /K$_2$x.y/K$_0$x.y/K$_1$x.y/K$_2$x.y/

$\|D\|$=/D$_0$x.y/D$_1$x.y/D$_2$x.y/D$_0$x.y/, /D$_1$x.y/D$_2$x.y/D$_0$x.y/D$_1$x.y/, /D$_2$x.y/D$_0$x.y/D$_1$x.y/D$_2$x.y/

$|S_{hv}\|$=/S/D0.0/D0.0/D0.1/, SOP for VDC data $\|S_{hd}\|$=/S/D0.0/D0.0/D1.1/, SOP for Data Island TERC4 data $\|T_0\|$=/T/I/I/I/, defined in IEEE 802.3 Clause 48

$\|I\|$=/I/I/I/I/, defined in IEEE 802.3 Clause 48 to map decoded data code groups Dx.y and decoded special code groups Kx.y to XGMII according to the following rules:

insert $\|S_{hv}\|$ in between $\|C_n\|$ and $\|D\|$ where $\|D\|$ is VDC data;

insert $\|S_{hd}\|$ in between $\|C_n\|$ and $\|D\|$ where $\|D\|$ is TERC4 data;

following any $\|S\|$, the 1$^{st}$ $\|D\|$=/D0/D1/D2/D0/, the 2$^{nd}$ $\|D\|$=/D1/D2/D0/D1/, and the 3$^{rd}$ $\|D\|$=/D2/D0/D1/D2/, etc.;

insert $\|T_n\|$, $\|I\|$ in between $\|D\|$ and $\|C\|$, $\|T_1\|$=/D2/T/I/I/, $\|T_2\|$=/D1/D2/T/I/, $\|T_3\|$=/D0/D1/D2/T/;

after a $\|T_n\|$ or $\|I\|$, the 1st $\|C\|$=/C0/C1/C2/C0/, the 2nd $\|C\|$=/C1/C2/C0/C1/, and the 3rd $\|C\|$=/C2/C0/C1/C2/, etc.;

the last $\|C\|$ before an $\|I\|$, $\|S_{hv}\|$ or $\|S_{ht}\|$ is padded with /I/ code groups, $\|C\|$=/C0/C1/C2/I/, /C1/C2/I/I/, or /C2/I/I/I/;

insert $\|T\|$, $\|I\|$, ..., $\|I\|$, $\|S_{hv}\|$ or $\|S_{ht}\|$ as appropriate in a sequence of $\|D\|$columns to rate match to 10.3125 GBaud;

insert $\|Tn\|$, $\|I\|$, ..., $\|I\|$, $\|S_{hv}\|$ or $\|S_{ht}\|$ as appropriate in a sequence of $\|D\|$ columns to rate match to 10.3125 GBd; and insert $\|I\|$ in a sequence of $\|C\|$ to rate match to the output digital interface standard.

9. The digital interface translator of claim 8, wherein the digital interface translator is configured to replace $\|I\|$ columns with auxiliary data received via the auxiliary channel.

10. The digital interface translator of claim 1, wherein the input digital interface standard is the DVI standard.

* * * * *